United States Patent
Kwak et al.

(10) Patent No.: US 12,120,561 B2
(45) Date of Patent: Oct. 15, 2024

(54) ELECTRONIC DEVICE PERFORMING HANDOVER AND METHOD FOR OPERATING THEREOF

(71) Applicant: SAMSUNG ELECTRONICS CO., LTD., Suwon-si (KR)

(72) Inventors: Yoseob Kwak, Suwon-si (KR); Jinyoung Song, Suwon-si (KR); Jungmin Oh, Suwon-si (KR); Sanghyun Lee, Suwon-si (KR); Byungho Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 364 days.

(21) Appl. No.: 17/525,584

(22) Filed: Nov. 12, 2021

(65) Prior Publication Data
US 2022/0167225 A1    May 26, 2022

Related U.S. Application Data

(63) Continuation of application No. PCT/KR2021/015914, filed on Nov. 4, 2021.

(30) Foreign Application Priority Data

Nov. 24, 2020  (KR) .................. 10-2020-0158408

(51) Int. Cl.
H04W 36/00    (2009.01)
H04W 88/06    (2009.01)

(52) U.S. Cl.
CPC ... H04W 36/0066 (2013.01); H04W 36/0058 (2018.08); H04W 36/0061 (2013.01);
(Continued)

(58) Field of Classification Search
None
See application file for complete search history.

(56) References Cited

U.S. PATENT DOCUMENTS 10,827,551 B1 * 11/2020 Marupaduga ......... H04W 92/10
2015/0131578 A1   5/2015 Baek et al.
(Continued)

FOREIGN PATENT DOCUMENTS

KR    10-2018-0064572    6/2018
KR    10-2018-0120217    11/2018
(Continued)

OTHER PUBLICATIONS

Extended European Search Report dated Jan. 23, 2024 for EP Application No. 21898412.8.
(Continued)

Primary Examiner — Frantz Bataille
(74) Attorney, Agent, or Firm — NIXON & VANDERHYE P.C.

(57) ABSTRACT

According to various embodiments, an electronic device may include at least one processor configured to support a first radio access technology (RAT) and a second RAT, wherein the at least one processor is configured to: receive a radio resource control (RRC) reconfiguration message including a measurement object (MO) from a network, based on the first RAT, and based on dual connectivity (DC) of the first RAT and the second RAT being identified to be restricted, perform a measurement of at least one first frequency satisfying a condition associated with a stand alone (SA) mode among at least one frequency based on the second RAT, which is identified based on the MO, and refrain from performing a measurement of at least one second frequency not satisfying the condition among the at least one frequency.

20 Claims, 18 Drawing Sheets

(52) U.S. Cl.
CPC . *H04W 36/0069* (2018.08); *H04W 36/00835* (2018.08); *H04W 88/06* (2013.01)

(56) References Cited

U.S. PATENT DOCUMENTS

| | | | |
|---|---|---|---|
| 2017/0070896 | A1 | 3/2017 | Shindo |
| 2017/0289874 | A1 | 10/2017 | Li et al. |
| 2018/0049079 | A1 | 2/2018 | Ozturk et al. |
| 2018/0359671 | A1 | 12/2018 | Xu et al. |
| 2018/0368016 | A1 | 12/2018 | Lee et al. |
| 2019/0379469 | A1 | 12/2019 | Lu et al. |
| 2020/0037387 | A1 | 1/2020 | Lee et al. |
| 2020/0100309 | A1 | 3/2020 | Jha et al. |
| 2020/0163023 | A1 | 5/2020 | Pelletier et al. |
| 2020/0267618 | A1 | 8/2020 | Kye et al. |
| 2020/0288338 | A1* | 9/2020 | Freda ............... H04W 76/19 |
| 2022/0167298 | A1 | 5/2022 | Kang et al. |

FOREIGN PATENT DOCUMENTS

| | | |
|---|---|---|
| KR | 10-2020-0011353 | 2/2020 |
| KR | 10-2020-0096225 | 8/2020 |
| KR | 10-2020-0099735 | 8/2020 |
| KR | 10-2020-0106702 | 9/2020 |
| KR | 10-2020-0114300 | 10/2020 |
| WO | 2014/109561 | 7/2014 |
| WO | 15/140848 | 9/2015 |
| WO | 18/221425 | 12/2018 |
| WO | 2019/072902 | 4/2019 |
| WO | WO 2020/199228 A1 | 10/2020 |

OTHER PUBLICATIONS

XP051849524A Samsung: "Remaining Issues concerning conditional change (mostly PSCell)" $3^{rd}$ Generation Partnership Project; Feb. 24, 2020; vol. RAN WG2; Online Greece; pp. 20200224-20200304.

International Search Report and Written Opinion dated Feb. 9, 2022 in corresponding International Application No. PCT/KR2021/015914.

"3GPP; TSGRAN; NR; Radio Resource Control (RRC) protocol specification; (Release 16)", 3GPP TS 38.331 V16.2.0, Oct. 7, 2020.

* cited by examiner

ELECTRONIC DEVICE PERFORMING HANDOVER AND METHOD FOR OPERATING THEREOF

CROSS-REFERENCE TO RELATED APPLICATIONS

This application is a continuation of International Application No. PCT/KR2021/015914 designating the United States, filed on Nov. 4, 2021, in the Korean Intellectual Property Receiving Office and claiming priority to Korean Patent Application No. 10-2020-0158408, filed on Nov. 24, 2020, in the Korean Intellectual Property Office, the disclosures of which are incorporated by reference herein in their entireties.

BACKGROUND

Field

The disclosure relates to an electronic device for performing a handover and a method for operating the same.

Description of Related Art

Recent development of mobile communication technologies has been followed by widespread use of portable terminals having various functions, and there were efforts to develop 5G communication systems for satisfying ever-increasing wireless data traffic demands. In order to accomplish higher data transmission rates, it has been considered to implement 5G communication systems in super-high frequency bands, in addition to high-frequency bands used for 5G and LTE, such that higher data transmission rates can be provided.

Schemes considered to implement 5G communication include a stand-alone (SA) scheme and a non-stand alone (NSA) scheme. According to the SA scheme, a UE may perform a radio access based on radio access technology (RAT) of new radio (NR), and may register in a core network of $5^{th}$ generation core (5GC). According to the NSA scheme, a UE may perform a radio access based on RAT of evolved UMTS (universal mobile telecommunications system) terrestrial radio access (EUTRA), and may register in a core network of evolved packet core (EPC). After registering in the EPC, the UE may transmit/receive data based on RAT of EUTRA and/or RAT of NR, based on dual connectivity. Technology used by the UE to transmit/receive data based on different types of RAT may be referred to as dual connectivity. According to the NSA scheme of 5G, dual connectivity proposed by 3GPP release-12 may be implemented in such a manner that a base station according to EUTRA is used as a master node, and a base station according to NR is used as a secondary node.

A UE may support both the SA mode and the NSA mode. In the NSA mode, the UE may transmit/receive data using different types of RAT, and, in this case, heating may occur, or the amount of consumed power may increase substantially. If the UE is in a high-temperature state, or if the battery power level is low, a problem may occur upon entering the NSA mode. Moreover, the UE may need to operate in the SA mode even in the high-temperature state or even if the battery power level is low. For example, the UE may need to perform an inter-RAT handover even in the high-temperature state or even if the battery power level is low.

SUMMARY

According to various embodiments, an electronic device and a method for operating the same which may perform measurement regarding a frequency deemed to support the SA mode, in a state in which dual connectivity (DC) is limited, and may perform no measurement regarding a frequency deemed to support the NSA mode.

According to various embodiments, an electronic device may include at least one processor configured to support a first radio access technology (RAT) and a second RAT, wherein the at least one processor is configured to: receive radio resource control (RRC) reconfiguration message including a measurement object (MO) from a network based on the first RAT, and based on dual connectivity (DC) of the first RAT and the second RAT being identified to be restricted, perform a measurement of at least one first frequency satisfying a condition associated with a stand alone (SA) mode among at least one frequency based on the second RAT, which is identified based on the MO, and refrain from performing a measurement of at least one second frequency not satisfying the condition among the at least one frequency.

According to various embodiments, a method of operating an electronic device configured to support a first radio access technology (RAT) and a second RAT may include: receiving a radio resource control (RRC) reconfiguration message including a measurement object (MO) from a network, based on the first RAT, based on dual connectivity (DC) of the first RAT and the second RAT being identified to be restricted, performing a measurement of at least one first frequency satisfying a condition associated with a stand alone (SA) mode among at least one frequency based on the second RAT, which is identified based on the MO, and refraining from performing a measurement of at least one second frequency not satisfying the condition among the at least one frequency.

According to various embodiments, an electronic device may include at least one processor configured to support a first radio access technology (RAT) and a second RAT, wherein the at least one processor is configured to: receive a radio resource control (RRC) reconfiguration message including a measurement object (MO) from a network, based on the first RAT, based on that dual connectivity (DC) of the first RAT and the second RAT being identified to be restricted, perform a measurement of at least one frequency based on the second RAT, which is identified based on the MO, based on a result of a measurement of at least partial frequency among the at least one frequency satisfying a report condition, report the measurement result to the network, based on the first RAT, based on a command of a handover to a cell corresponding to the second RAT being received from the network in response to the reporting, perform a procedure of a handover from a cell corresponding to the first RAT to a cell corresponding to the second RAT, and based on another RRC reconfiguration message relating to second cell group (SCG) adding of a cell corresponding to the second RAT being received from the network in response to the reporting, transmit an SCG failure information message to the network, based on the first RAT.

Various embodiments may provide an electronic device and a method for operating the same, wherein measurement may be performed regarding a frequency deemed to support the SA mode, in a state in which DC is limited, and no measurement may be performed regarding a frequency deemed to support the NSA mode. Accordingly, in a state in which DC is limited, an operation to the NSA mode may be limited, an inter-RATE handover for the SA mode may be performed.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
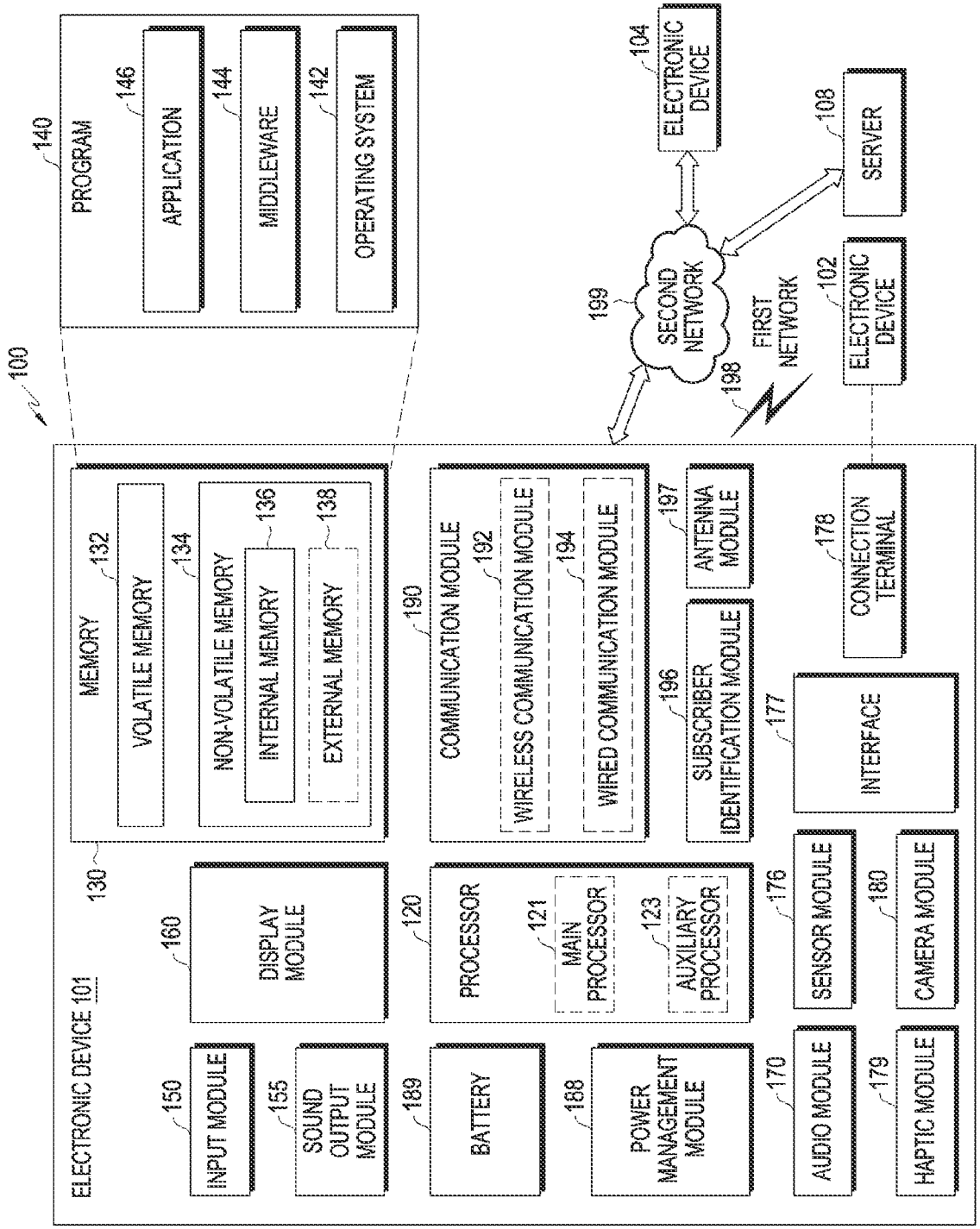
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).\

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
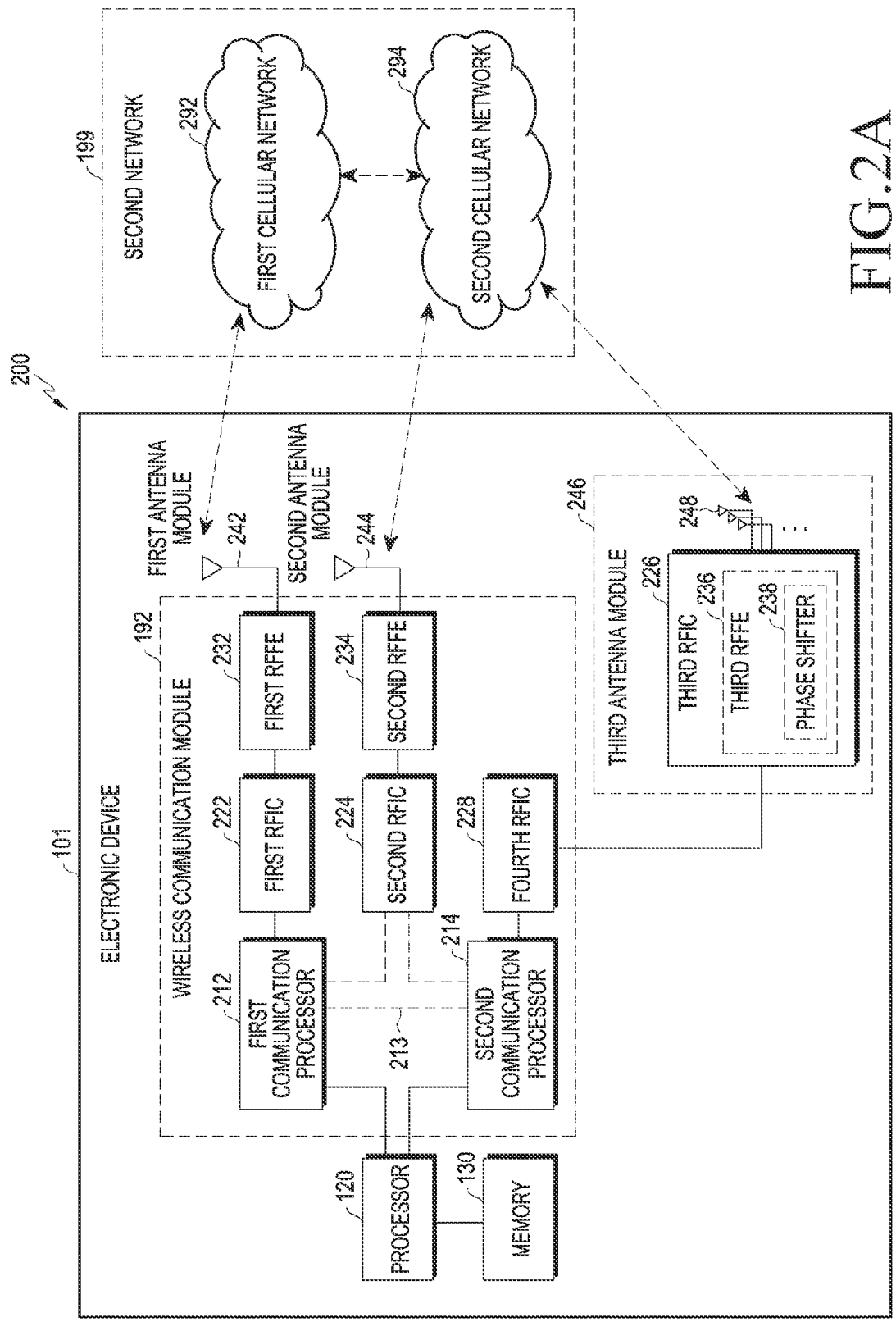
FIG. 2A and FIG. 2B are block diagrams of an electronic device for supporting legacy network communication and 5G network communication according to various embodiments.

FIG. 2A is a block diagram 200 of an electronic device 101 for supporting legacy network communication and 5G network communication according to various embodiments. Referring to FIG. 2A, the electronic device 101 may include a first communication processor (e.g., processing circuitry) 212, a second communication processor (e.g., processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to an embodiment, the electronic device 101 may further include at least one component among the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to an embodiment, the fourth RFIC 228 may be omitted, or may be included as a part of the third RFIC 226.

The first communication processor 212 may include various processing circuitry and establish a communication channel within a band to be used for wireless communication with the first cellular network 292, and may support legacy network communication performed through the established communication channel. According to various embodiments, the first cellular network may be a legacy network including a second generation (2G), 3G, 4G, or long-term evolution (LTE) network. The second communication processor 214 may establish a communication channel corresponding to a designated band (e.g., about 6 GHz-60 GHz) among bands to be used for wireless communication with the second cellular network 294, and may support 5G network communication performed through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or lower) among bands to be used for wireless communication with the second cellular network 294, and may support 5G network communication performed through the established communication channel.

The first communication processor 212 may transmit or receive data to or from the second communication processor 214. For example, data which has been classified to be transmitted through the second cellular network 294 may be changed to be transmitted through the first cellular network 292. In this case, the first communication processor 212 may receive transmission data from the second communication processor 214. For example, the first communication processor 212 may transmit or receive data to or from the second communication processor 214 through an interprocessor interface 213. The interprocessor interface 213 may be implemented as, for example, a universal asynchronous receiver/transmitter (UART) (e.g., a high speed-UART (HS-UART) or peripheral component interconnect bus express (PCIe) interface), but the type thereof is not limited. Alternatively, the first communication processor 212 and the second communication processor 214 may exchange control information and packet data information using, for example, a shared memory. The first communication processor 212 may transmit or receive, to or from the second communication processor 214, various information, such as sensing information, information on output strength, and resource block (RB) allocation information.

According to implementation, the first communication processor 212 may not be directly connected to the second communication processor 214. In this case, the first communication processor 212 may transmit or receive data to or from the second communication processor 214 through the processor 120 (e.g., an application processor). For example, the first communication processor 212 and the second communication processor 214 may transmit or receive data to or from each other through the processor 120 (e.g., an application processor) and an HS-UART interface or a PCIe interface, but the type of an interface is not limited. Alternatively, the first communication processor 212 and the second communication processor 214 may exchange control information and packet data information using the processor 120 (e.g., an application processor) and a shared memory.

Figure 2B:
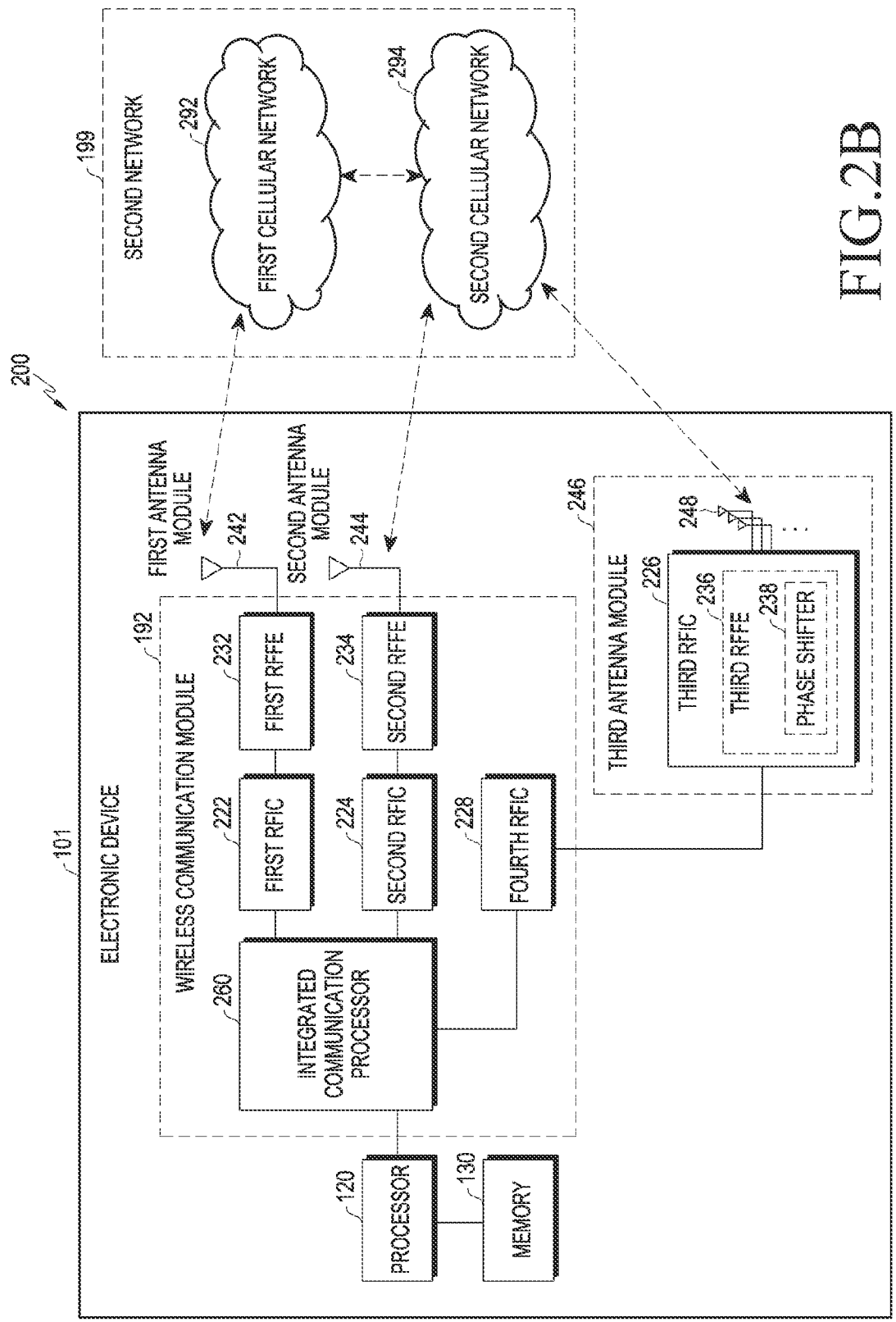

According to an embodiment, the first communication processor 212 and the second communication processor 214 may be implemented in a single chip or a single package. According to various embodiments, the first communication processor 212 or the second communication processor 214 may be configured in a single chip or a single package together with the processor 120, the auxiliary processor 123, or the communication module 190. For example, as illustrated in FIG. 2B, an integrated communication processor 260 may support both a function for communication with the first cellular network 292 and a function for communication with the second cellular network 294.

The first RFIC 222 may convert, at the time of transmission, a baseband signal generated by the first communication processor 212 into a radio frequency (RF) signal having a frequency of about 700 MHz to about 3 GHz, which is used in the first cellular network 292 (e.g., a legacy network). At the time of reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert a preprocessed RF signal into a baseband signal so as to enable the preprocessed RF signal to be processed by the first communication processor 212.

The second RFIC 224 may convert, at the time of transmission, a baseband signal generated by the first communication processor 212 or the second communication processor 214 into a RF signal (hereinafter, a 5G Sub6 RF signal) within a Sub6 band (e.g., about 6 GHz or lower) used in the second cellular network 294 (e.g., a 5G network). At the time of reception, a 5G Sub6 RF signal may be obtained from the second cellular network 294 (e.g., a 5G network) through an antenna (e.g., the second antenna module 244), and may be preprocessed through an RFFE (e.g., the second RFFE 234). The second RFIC 224 may convert a preprocessed 5G Sub6 RF signal into a baseband signal so as to enable the preprocessed 5G Sub6 RF signal to be processed by a corresponding communication processor among the first communication processor 212 or the second communication processor 214.

The third RFIC 226 may convert a baseband signal generated by the second communication processor 214 into a RF signal (hereinafter, a 5G Above6 RF signal) within a 5G Above6 band (e.g., about 6 GHz-about 60 GHz) to be used in the second cellular network 294 (e.g., a 5G network). At the time of reception, a 5G Above6 RF signal may be obtained from the second cellular network 294 (e.g., a 5G network) through an antenna (e.g., the antenna 248), and may be preprocessed through a third RFFE 236. The third RFIC 226 may convert a preprocessed 5G Above6 RF signal into a baseband signal so as to enable the preprocessed 5G Above6 RF signal to be processed by the second communication processor 214. According to an embodiment, the third RFFE 236 may be configured as a part of the third RFIC 226.

According to an embodiment, the electronic device 101 may include the fourth RFIC 228 separately from or at least a part of the third RFIC 226. In this case, the fourth RFIC 228 may convert a baseband signal generated by the second communication processor 214 into an RF signal (hereinafter, an IF signal) within an intermediate frequency band (e.g., about 9 GHz-11 GHz), and then transfer the IF signal to the third RFIC 226. The third RFIC 226 may convert an IF signal into a 5G Above6 RF signal. At the time of reception, a 5G Above6 RF signal may be received from the second cellular network 294 (e.g., a 5G network) through an antenna (e.g., the antenna 248), and may be converted into an IF signal by the third RFFE 226. The fourth RFIC 228 may convert an IF signal into a baseband signal so as to enable the IF signal to be processed by the second communication processor 214.

According to an embodiment, the first RFIC 222 and the second RFIC 224 may be implemented as at least a part of a single chip or a single package. According to various embodiments, as illustrated in FIG. 2A or FIG. 2B, when the first RFIC 222 and the second RFIC 224 are implemented as a single chip or a single package, the first RFIC and the second RFIC may be implemented as an integrated RFIC. In this case, the integrated RFIC may be connected to the first RFFE 232 and the second RFFE 234 so as to convert a baseband signal into a signal within a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module among the first antenna module 242 or the second antenna module 244 may be omitted or combined with another antenna module so as to process RF signals within multiple corresponding bands.

According to an embodiment, the third RFIC 226 and the antenna 248 may be arranged on the same substrate so as to configure the third antenna module 246. For example, the wireless communication module 192 or the processor 120 may be disposed on a first substrate (e.g., a main PCB). In this case, the third RFIC 226 may be disposed in a partial area (e.g., a lower surface) of a second substrate (e.g., a sub PCB) separate from the first substrate, and the antenna 248 may be disposed in another partial area (e.g., an upper surface), so as to configure the third antenna module 246. The length of a transmission line between the third RFIC 226 and the antenna 248 can be reduced by arranging the third RFIC and the antenna on the same substrate. Therefore, for example, loss (e.g., attenuation) of, by a transmission line, a signal within a high frequency band (e.g., about 6 GHz-about 60 GHz) used for 5G network communication can be reduced. Accordingly, the electronic device 101 can improve the quality or speed of communication with the second cellular network 294 (e.g., a 5G network).

According to an embodiment, the antenna 248 may be configured to be an antenna array including multiple antenna elements which are usable for beamforming. In this case, the third RFIC 226 may include, for example, as a part of the third RFFE 236, multiple phase shifters 238 corresponding to the multiple antenna elements. At the time of transmission, each of the multiple phase shifters 238 may convert the phase of a 5G Above6 RF signal to be transmitted to an outside (e.g., a base station of a 5G network) of the electronic device 101 through a corresponding antenna element. At the time of reception, each of the multiple phase shifters 238 may convert, into an identical or a substantially identical phase, the phase of a 5G Above6 RF signal which has been received from the outside through a corresponding antenna element. This process enables transmission or reception through beamforming between the electronic device 101 and the outside.

The second cellular network 294 (e.g., a 5G network) may be operated independently to the first cellular network 292 (e.g., a legacy network) (e.g., stand-alone (SA), or may be operated while being connected thereto (e.g., non-stand-alone (NSA)). For example, there may be only an access network (e.g., a 5G radio access network (RAN) or a next generation RAN (NG RAN)) in a 5G network without a core network (e.g., a next generation core (NGC)). In this case, the electronic device 101 may access a access network of a 5G network, and then access an external network (e.g., Internet) under the control of a core network (e.g., an evolved packed core (EPC)) of a legacy network. Protocol information (e.g., LTE protocol information) for communication with a legacy network or protocol information (e.g., new radio (NR) protocol information) for communication with a 5G network may be stored in the memory 130, and may be accessed by another component (e.g., the protocol 120, the first communication protocol 212, or the second communication protocol 214).

Figure 3A:
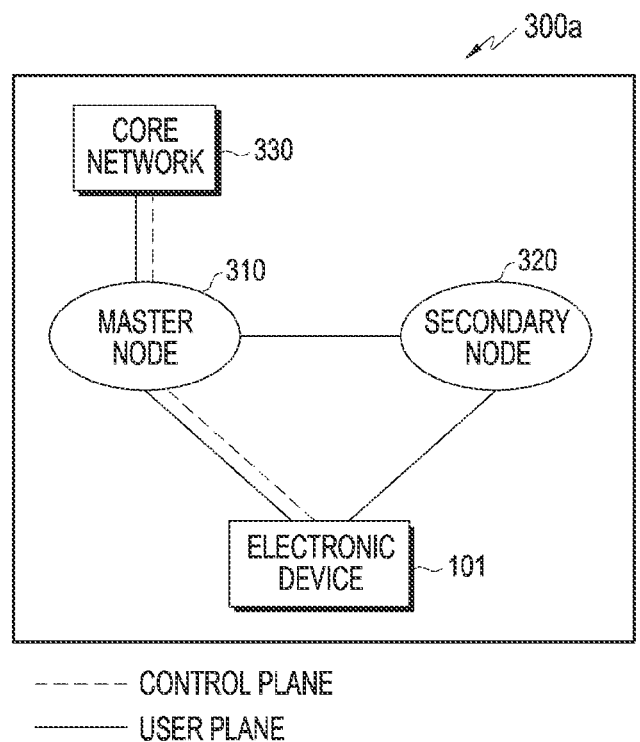
FIG. 3A, FIG. 3B, and FIG. 3C are diagrams illustrating wireless communication systems providing a legacy communication and/or 5G communication network according to various embodiments.
Figure 3B:
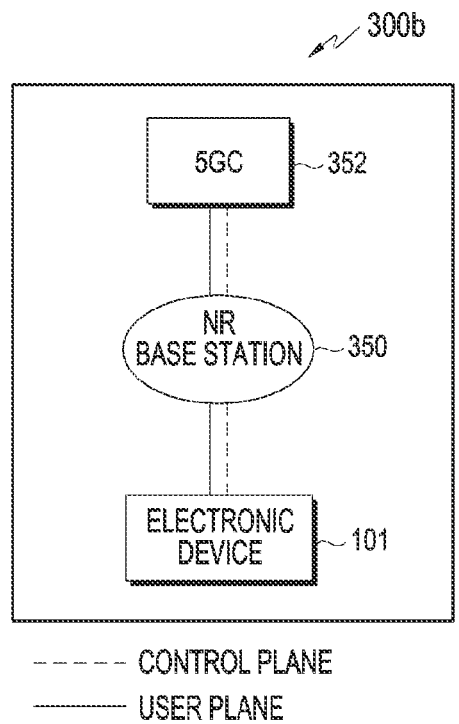
Figure 3C:
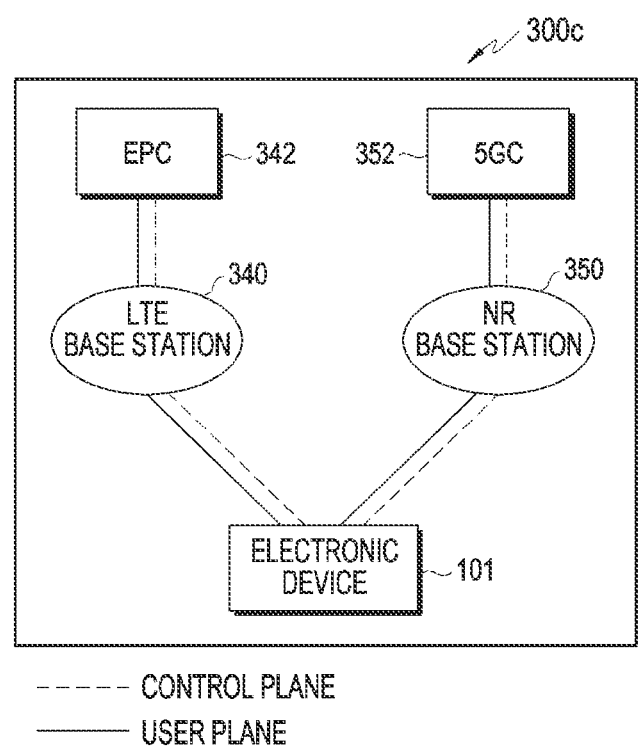

FIG. 3A, FIG. 3B, and FIG. 3C are diagrams illustrating wireless communication systems providing a legacy communication and/or 5G communication network according to various embodiments. Referring to FIGS. 3A, 3B, and 3C, each of network environments 300a to 300c may include at least one of a legacy network and a 5G network. The legacy network may include, for example, a 3GPP standard 4G or LTE base station 340 (e.g., an eNodeB (eNB)) which supports wireless access with the electronic device 101, and an evolved packet core (EPC) 342 which manages 4G communication. The 5G network may include, for example, a new radio (NR) base station 350 (e.g., a gNB (gNodeB)) which supports wireless access with the electronic device 101, and a 5th generation core (5GC) 352 which manages 5G communication of the electronic device 101.

According to various embodiments, the electronic device 101 may transmit or receive a control message and user data through legacy communication and/or 5G communication. The control message may include, for example, a message related to at least one of security control, bearer setup, authentication, registration, or mobility management of the electronic device 101. The user data may indicate user data except for a control message which is transmitted or received between the electronic device 101 and a core network 330 (e.g., the EPC 342).

Referring to FIG. 3A, the electronic device 101 according to an embodiment may transmit or receive at least one of a control message or user data to or from at least a part (e.g., the NR base station 350 or the 5GC 352) of a 5G network using at least a part (e.g., the LTE base station 340 or the EPC 342) of a legacy network.

According to various embodiments, the network environment 300a may include a network environment which provides wireless communication dual connectivity (DC) to the LTE base station 340 and the NR base station 350, and enables transmission or reception of a control message to or from the electronic device 101 through one core network 330 among the EPC 342 or the 5GC 352.

According to various embodiments, in a DC environment, one base station among the LTE base station 340 or the NR base station 350 may be operated as a master node 310, and the other one may be operated as a secondary node (SN) 320. The MN 310 may be connected to the core network 230 so as to transmit or receive a control message thereto or therefrom. The MN 310 and the SN 320 may be connected to each other through a network interface so as to transmit or receive a message related to management of a wireless resource (e.g., a communication channel) to or from each other.

According to various embodiments, the MN 310 may be configured by the LTE base station 340, the SN 320 may be configured by the NR base station 350, and the core network 330 may be configured by the EPC 342. For example, a control message may be transmitted or received through the LTE base station 340 and the EPC 342, and user data may be transmitted or received through at least one of the LTE base station 340 or the NR base station 350.

According to various embodiments, the MN 310 may be configured by the NR base station 350, the SN 320 may be configured by the LTE base station 340, and the core network 330 may be configured by the 5GC 352. For example, a control message may be transmitted or received through the NR base station 350 and the 5GC 352, and user data may be transmitted or received through at least one of the LTE base station 340 or the NR base station 350.

Referring to FIG. 3B, according to various embodiments, a 5G network may be configured by the NR base station 350 and the 5GC 352, and may transmit or receive a control message and user data independently to the electronic device 101.

Referring to FIG. 3C, a legacy network and a 5G network according to various embodiments may independently provide data transmission or reception. For example, the electronic device 101 and the EPC 342 may transmit or receive a control message and user data to or from each other through the LTE base station 340. As another example, the electronic device 101 and the 5GC 352 may transmit or receive a control message and user data to or from each other through the NR base station 350.

According to various embodiments, the electronic device 101 may be registered in at least one of the EPC 342 or the 5GC 352 so as to transmit or receive a control message thereto or therefrom.

According to various embodiments, the EPC 342 or the 5GC 352 may interwork with each other to manage communication of the electronic device 101. For example, movement information of the electronic device 101 may be transmitted or received through an interface between the EPC 342 and the 5GC 352.

As described above, dual connectivity through the LTE base station 340 and the NR base station 350 may be named as E-UTRA new radio dual connectivity (EN-DC).

Figure 4:
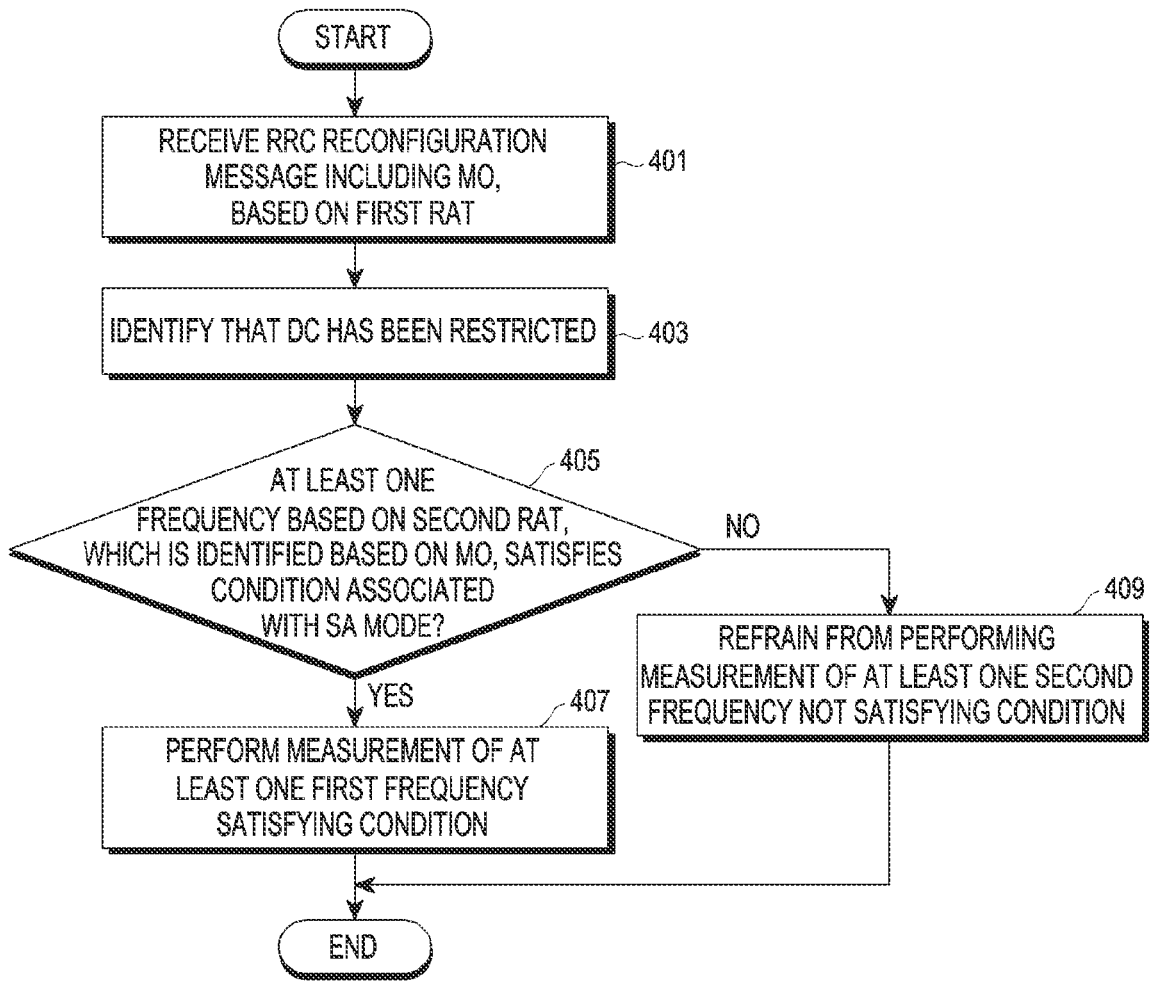
FIG. 4 is a flowchart illustrating an operation method of an electronic device according to various embodiments.
Figure 5:
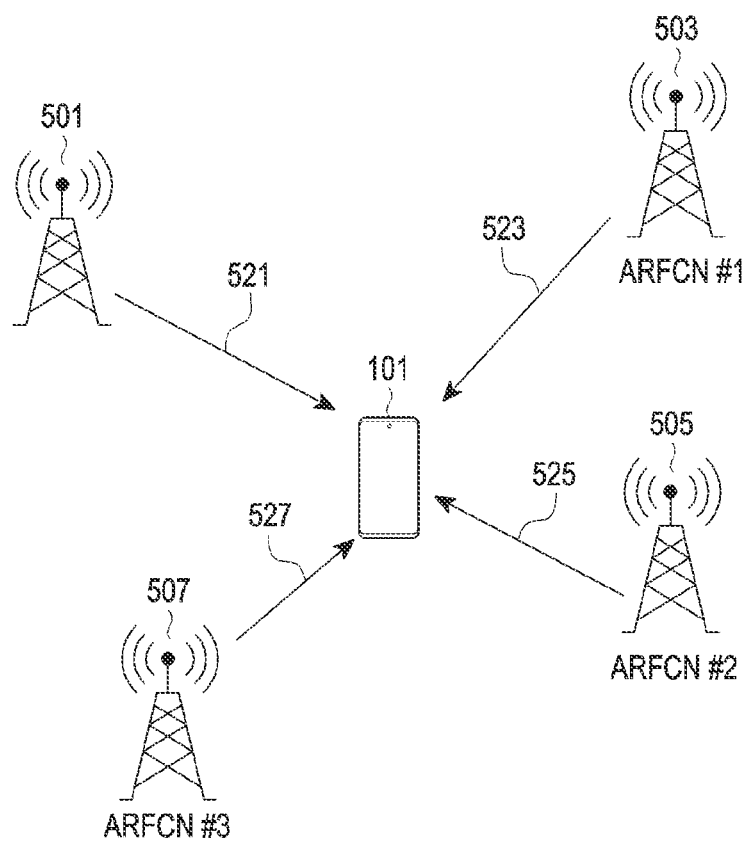
FIG. 5 illustrates multiple base stations and an electronic device according to various embodiments.

FIG. 4 is a flowchart illustrating an operation method of an electronic device according to various embodiments. An embodiment of FIG. 4 will be described with reference to FIG. 5. FIG. 5 illustrates multiple base stations and an electronic device according to various embodiments.

According to various embodiments, the electronic device 101 (e.g., at least one of the processor 120, the first communication processor 212, the second communication processor 214, or the integrated communication processor 260) may receive a radio resource control (RRC) reconfiguration message including a measurement object (MO), based on a first RAT in operation 401. The first RAT may be E-UTRA or NR. In the embodiment of FIG. 4, the electronic device 101 may have been registered in an EPC, based on E-UTRA, or may have been registered in a 5GC, based on NR, and for example, the electronic device 101 may be in an RRC_CONNECTED state, but the disclosure is not limited thereto. The electronic device 101 may be configured to report measurement information according to a measurement configuration provided by a network. For example, if the electronic device 101 is in an RRC_CONNECTED state, the network may provide a message configuration using a dedicated signaling means, for example, an RRC reconfiguration message. According to various embodiments, in a case where the first RAT is E-UTRA, the RRC reconfiguration message may be a RRCConnectionReconfiguration message or RRCConnectionResume message following, for example, 3$^{rd}$ generation partnership project (3GPP) technical specification (TS) 36.331. In a case where the first RAT is NR, the RRC reconfiguration message may be an RRCReconfiguration message following, for example, 3GPP TS 38.331. However, the disclosure is not limited thereto.

According to various embodiments, the MO may include information associated with a frequency (or a cell (e.g., a cell for the first RAT and/or a cell for a second RAT) for which a user equipment (UE) is required to perform a measurement. The information associated with a cell may include at least one of a frequency channel number, cell identification information (e.g., a physical cell identifier (PCI)), a blacklist, or a cell-specific offset value. For example, when the first RAT is E-UTRA, the second RAT may be NR, and the MO may include, for example, a single NR carrier frequency. For example, when the first RAT is NR, the second RAT may be E-UTRA and the MO may include, for example, a single E-UTRA carrier frequency. The RRC reconfiguration message may include a reporting configuration, and for example, include a report condition to perform a measurement report (MR). The RRC reconfiguration message may include at least one of a measurement ID for identification of the MO, a quantity configuration indicating a value required to be measured by the UE, or a measurement gap associated with a measurement period.

According to various embodiments, the electronic device 101 may identify that dual connectivity is restricted, in operation 403. In various embodiments, whether DC is restricted may be determined by, for example, the processor 120, and the processor 120 may transfer a result of the determination to a communication processor (e.g., at least one of the first communication processor 212, the second communication processor 214, or the integrated communication processor 260). In various embodiments, the communication processor may be configured to determine whether DC is restricted. The communication processor may determine whether DC is restricted, based on information transferred from the processor 120, and/or may determine whether DC is restricted, based on information obtained by the communication processor.

For example, the state where DC is restricted may correspond to a case where the remaining power of a battery of the electronic device 101 is equal to or lower than threshold remaining power (e.g., 15%). For example, the state where DC is restricted may correspond to, for example, a case where the remaining power of a battery of the electronic device 101 is equal to or less than threshold remaining power. The consumption speed (e.g., a battery power amount reduced per unit time) of the battery in a case of using DC may be greater than the consumption speed of the battery in a case of not using DC. Therefore, when the remaining power of the battery is equal to or less than threshold remaining power, DC restriction may be configured to save the battery.

For example, the state where DC is restricted may correspond to a case where a current and/or predicted transmission and/or reception data rate of the electronic device 101 is equal to or less than a threshold data rate (e.g., 30 Mbps). As DC is used, a data rate may increase. However, in a case where a current and/or predicted data rate is relatively small, there is less benefit in using DC. Therefore, in a case where a current and/or predicted transmission and/or reception data rate is equal to or less than a threshold data rate, DC restriction may be configured. The case where a current and/or predicted transmission and/or reception data rate is equal to or less than a threshold data rate may correspond to, for example, a case where VoIP (e.g., voice over LTE (VoLTE) or voice over NR (VoNR)) is running, or a state where a screen of the electronic device 101 has been turned off. The case where a current and/or predicted transmission and/or reception data rate is equal to or less than a threshold data rate may be identified based on, for example, the type of an application that is running in a foreground and/or a background. The case where a current and/or predicted transmission and/or reception data rate is equal to or less than a threshold data rate may also be identified based on, for example, a scheduling rate for an uplink and/or downlink resource. For example, the scheduling rate may be measured based on the number of downlink control indicators (DCIs) (e.g., DCI format 0 or DCI format 1) received per reference time (e.g., one second). There is no limit to a condition associated with the data rate.

For example, the state where DC is restricted may correspond to a case where a current temperature of the electronic device 101 is equal to or greater than a threshold temperature (e.g., 39° C.). The amount of heat generated from the electronic device 101 in a case of using DC may be greater than the amount of heat generated in a case of not using DC. In a case of using DC, the temperature may continuously increase, and this may cause damage to the electronic device 101. Therefore, in a case where the current temperature is equal to or greater than a threshold temperature, DC restriction may be configured. The current temperature of the electronic device 101 may include, for example, a current temperature of at least one element (e.g., the processor 120, the first communication processor 212, the second communication processor 214, the integrated communication processor 260, and/or the wireless communication module 192) included in the electronic device 101. For example, the electronic device 101 may measure the current temperature of the electronic device 101 through a temperature sensor (e.g., the sensor module 176 in FIG. 1) which is included in at least one element, or is close to the surface of at least one element.

For example, the state where DC is restricted may be a case of using a subscriber identification module (SIM) not requiring use of an Internet pack data network (PDN) (or data network name (DNN)). The electronic device 101 may support multi SIMs. In a case where the multi SIMs support a dual SIM dual standby (DSDS) mode, while an RF resource is used to transmit or receive data associated with one SIM among multi SIMs, the other SIMs may stand by. One of the multi SIMs may be configured to be able to process a data packet (e.g., a packet associated with an Internet PDN), and another one may be configured to be able to process a voice packet (e.g., a packet associated with an IMS PDN). The voice packet has a relatively small size, and thus may have less benefit in using DC. Therefore, in a case where the multi SIMs are operated in a DSDS mode, when a SIM associated with voice packet processing is operated, DC restriction may be configured.

In the embodiment of FIG. 4, the electronic device 101 identifies that DC is restricted, after receiving an RRC reconfiguration message. However, this illustration merely corresponds to an example, and the electronic device 101 may also receive an RRC reconfiguration message in the state where DC is restricted. Furthermore, those skilled in the art may understand that there is no limit on the order in a flowchart according to various embodiments.

According to various embodiments, in a case where the electronic device 101 is in a DC restriction state, the electronic device 101 may determine whether at least one frequency based on the second RAT, which is identified based on the MO, satisfies a condition associated with an SA mode, in operation 405. The condition associated with the SA mode may be, for example, a condition associated with whether a cell having a corresponding frequency can support the SA mode. In one example, the condition associated with the SA may be that there is a history of supporting, by a corresponding frequency, the SA mode. In one example, the condition associated with the SA may be that there is no history of supporting, by a corresponding frequency, an NSA mode. In one example, the condition associated with the SA mode may be that a corresponding frequency is included in a system information block (SIB) 24 provided by a base station (e.g., an eNB in a case where the first RAT is E-UTRA) associated with the first RAT. In one example, the condition associated with the SA mode may be that a corresponding frequency is included in a system information block (SIB) 1 provided by a base station (e.g., a gNB in a case where the second RAT is NR) associated with the second RAT.

Referring to FIG. 5, for example, the electronic device 101 may have been registered in a core network (e.g., an EPC) corresponding to the first RAT (e.g., E-UTRA) using a first base station 501 as a serving cell. The electronic device 101 may have established an RRC connection with the first base station 501 (e.g., an eNB) based on the first RAT (e.g., E-UTRA). The electronic device 101 may receive an RRC reconfiguration message 521 from the first base station 501. The electronic device 101 may identify at least one frequency associated with the second RAT (e.g., NR) from an MO included in the RRC reconfiguration message 521. For example, the MO may include at least one single NR carrier frequency (e.g., ARFCN #1, ARFCN #2, or ARFCN #3). ARFCN #1 may be, for example, an absolute radio frequency channel number (ARFCN) of a second base station 503 (e.g., a gNB) based on the second RAT (e.g., NR). ARFCN #2 may be, for example, the ARFCN of a third base station 505 (e.g., a gNB) based on the second RAT (e.g., NR). ARFCN #3 may be, for example, the ARFCN of a fourth base station 507 (e.g., a gNB) based on the second RAT (e.g., NR). The neighbor base stations 503, 505, and 507 may transmit synchronization signals 523, 525, and 527 (e.g., SSBs). Those skilled in the art may understand that, in a case where the first RAT is NR and the second RAT is E-UTRA, the neighbor base stations 503, 505, and 507 can transmit reference signals (e.g., CSI-RSs).

Referring to FIG. 4 again, according to various embodiments, when the condition associated with the SA mode is satisfied (operation 405—Yes), the electronic device 101 may perform a measurement of at least one first frequency satisfying the condition in operation 407. The measurement may indicate a measurement of reference signal received power (RSRP), a reference signal received quality (RSRQ), signal to interference noise ratio (SINR), a received signal strength indicator (RSSI), and/or a signal-to-noise ratio (SNR) at a timing of measurement of a signal (e.g., a synchronization signal and/or a reference signal) corresponding to the first frequency. However, the disclosure is not limited thereto. When the condition associated with the SA mode is not satisfied (operation 405—No), the electronic device 101 may refrain from performing a measurement of at least one second frequency not satisfying the condition in operation 409. For example, in the embodiment of FIG. 5, ARFCN #1 may be included in an SIB-24 from the first base station 501, and ARFCN #2 and ARFCN #3 may be managed to have a history of performing DC. In this case, the electronic device 101 may determine that ARFCN #1 satisfies the condition associated with SA, and ARFCN #2 and ARFCN #3 do not satisfy the condition associated with SA. The electronic device 101 may perform a measurement of the synchronization signal 523 corresponding to ARFCN #1. The electronic device 101 may refrain from performing a measurement of the synchronization signals 525 and 527 corresponding to ARFCN #2 and ARFCN #3. At timings of measurement of the synchronization signals 525 and 527, the electronic device 101 may refrain from performing an operation (e.g., a switching operation for connection to an RX antenna, and/or a measurement of RSRP, RSRQ, SNR, or SINR) for signal measurement.

According to various embodiments, when a report condition for at least one first frequency (e.g., ARFCN #1) is satisfied, the electronic device 101 may perform a measurement report. The network may determine a handover to the second base station 503, based on the measurement report. In this case, the electronic device 101 may perform a handover (e.g., an inter RAT handover) from the first base station 501 to the second base station 503. A measurement on at least one second frequency (e.g., ARFCN #2 or ARFCN #3) may not be performed, thereby preventing and/or alleviating adding of a second cell group (SCG) for DC of the third base station 505 and the fourth base station 507. Therefore, DC may not be performed, and thus a problem caused by DC usage in the DC restriction state can be prevented and/or alleviated. Those skilled in the art may understand that the electronic device 101 not measuring a particular frequency may be replaced with, for example, refrain from performing a measurement report even when a report condition is satisfied after a measurement.

Figure 6A:
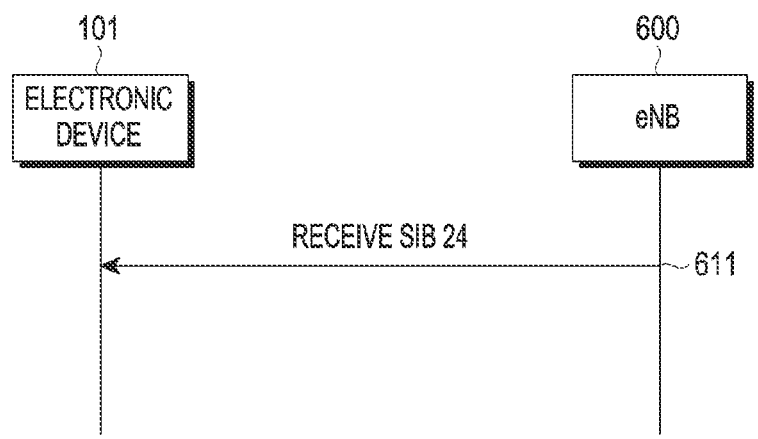
FIG. 6A is a flowchart illustrating an operation method of an electronic device and an eNB according to various embodiments.

FIG. 6A is a flowchart illustrating an operation method of an electronic device and an eNB according to various embodiments.

According to various embodiments, the electronic device 101 (e.g., at least one of the processor 120, the first communication processor 212, the second communication processor 214, or the integrated communication processor 260) may receive an SIB 24 from an eNB 600 in operation 611. The eNB 600 may transmit an SIB 24 to the electronic device 101 to enable the electronic device 101 to perform cell re-selection. In 3GPP TS 36.331, an SIB 24 is described as an information element (IE) of systeminformationblocktype 24. The SIB 24 may include information relevant for NR neighboring cells and inter-RAT cell for cell re-selection i.g. information about NR frequencies. The SIB 24 may include a cell re-selection parameters common for a frequency. The SIB 24 may include, for example, information (e.g., an ARFCN) on an NR frequency which supports an SA mode. While a cell associated with the eNB 600 is camped on, the electronic device 101 may identify information on an NR cell supporting an SA mode around the cell. The electronic device 101 according to various embodiments may identify a frequency supporting an SA mode therearound, based on information included in the SIB 24.

Figure 6B:
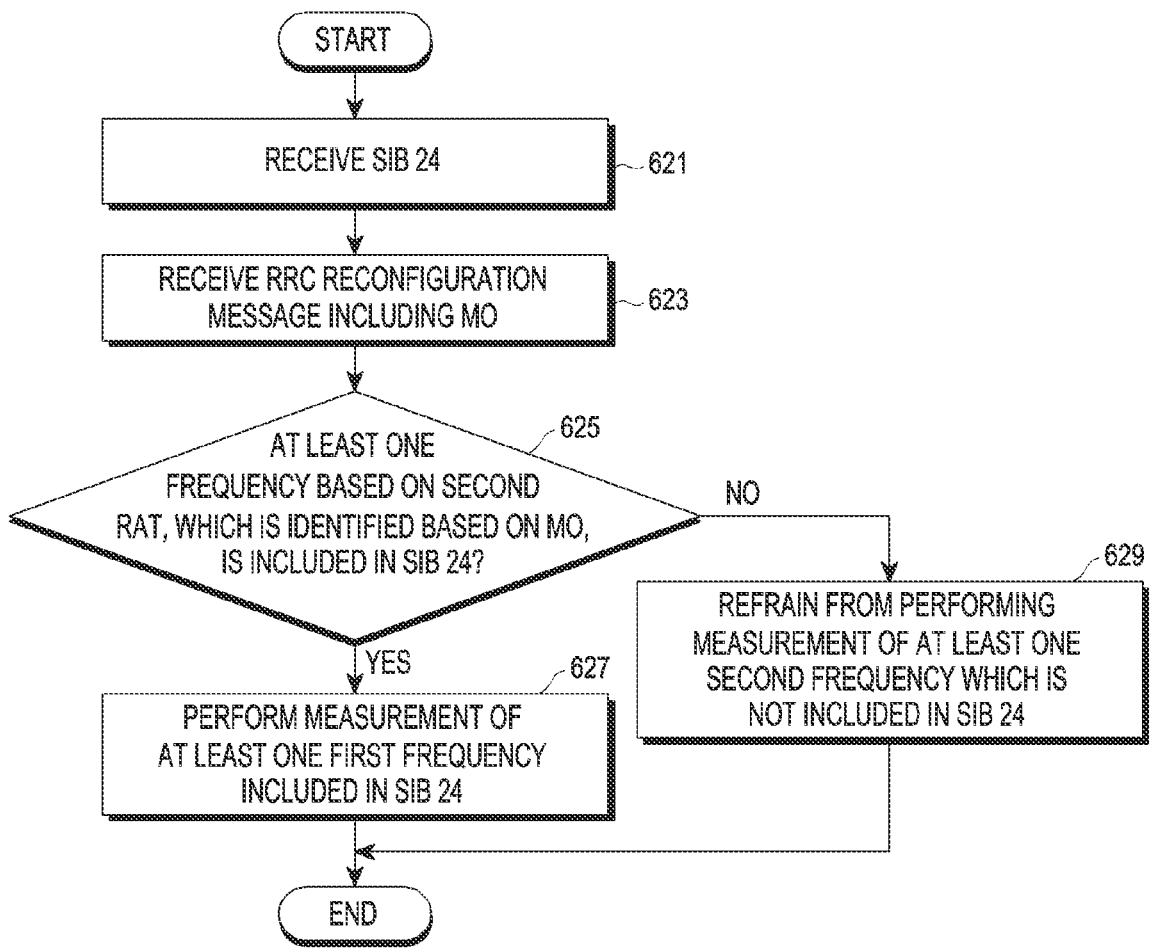
FIG. 6B is a flowchart illustrating an operation method of an electronic device according to various embodiments.

FIG. 6B is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive an SIB 24 from a network (e.g., the eNB 600) in operation 621. For example, Table 1 shows an example of the SIB 24 received by the electronic device 101.

TABLE 1

SystemInformationBlockType24
carrierFreqListNR-r15: 1 item
Item 0
  CarrierFreqNR-r15
  carrierFreq-r15: 627264

The SIB 24 according to the example in Table 1 may include an ARFCN of "627264" as a frequency for a neighbor NR cell, for which cell re-selection of the network (e.g., the eNB 600) is enabled, for example, as an NR frequency supporting an SA mode.

According to various embodiments, the electronic device 101 may receive an RRC reconfiguration message including an MO from the network in operation 623. Those skilled in the art may understand that there is no limit on the order between operation 621 and operation 623. For example, Table 2 shows an example of the RRC reconfiguration message received by the electronic device 101.

TABLE 2 measObjectId: 2
measObject: measObjectNR-r15 (5)
measObjectNR-r15
  carrierFreq-r15: 636654
measObjectId: 3
measObject: measObjectNR-r15 (5)

TABLE 2-continued measObjectNR-r15
  carrierFreq-r15: 627264

The RRC reconfiguration message according to the example in Table 2 may include ARFCNs of "636654" and "627264" as frequencies to be measured.

According to various embodiments, the electronic device 101 may determine whether at least one frequency based on a second RAT, which is identified based on the MO, is included in the SIB 24 in operation 625. In a case where it is determined that the at least one frequency based on the second RAT, which is identified based on the MO, is included in the SIB 24 (operation 625—Yes), the electronic device 101 may perform a measurement of at least one first frequency included in the SIB 24 in operation 627. In a case where it is not determined that the at least one frequency based on the second RAT, which is identified based on the MO, is included in the SIB 24 (operation 625—No), the electronic device 101 may refrain from performing a measurement of at least one second frequency which is not included in the SIB 24 in operation 629. For example, based on the SIB 24 according to the example in Table 1, and the RRC reconfiguration message according to the example in Table 2, the electronic device 101 may identify that the ARFCN of "627264" is included in the SIB 24, and the ARFCN of "636654" is not included in the SIB 24. The electronic device 101 may perform a measurement of the ARFCN of "627264" identified to be included in the SIB 24. If it is determined that a result of the measurement of the ARFCN of "627264" satisfies a report condition, the electronic device 101 may perform a measurement report (MR). According to the measurement report, the network may determine a handover of the electronic device 101 to a cell corresponding to the ARFCN of "627264", and the electronic device 101 may perform the handover. The electronic device 101 may refrain from performing a measurement of the ARFCN of "636654" identified not to be included in the SIB 24. The electronic device 101 has not performed the measurement, and thus may refrain from performing an MR of the ARFCN of "636654". Accordingly, SCG adding associated with a cell corresponding to the ARFCN of "636654" can be prevented and thus DC can be restricted.

Figure 7:
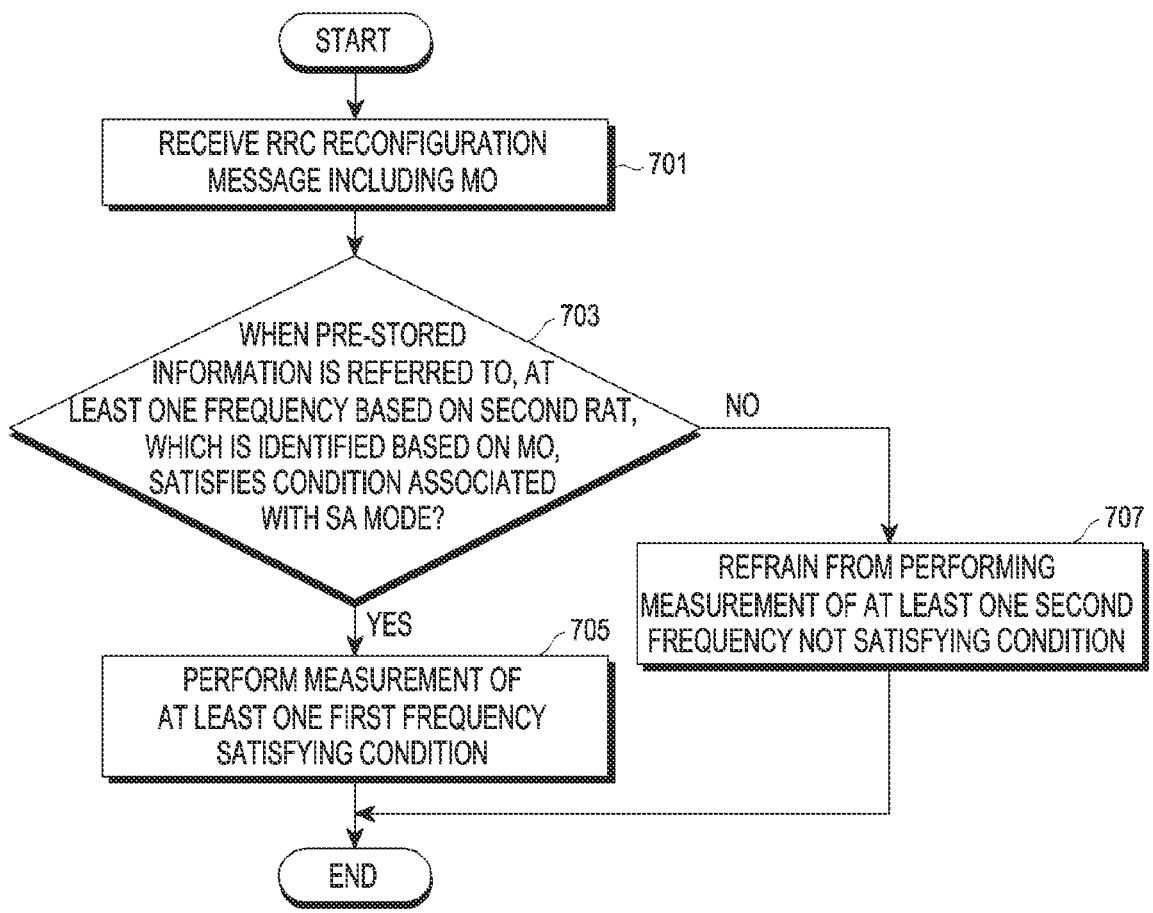
FIG. 7 is a flowchart illustrating an operation method of an electronic device according to various embodiments.

FIG. 7 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including an MO in operation 701. In operation 703, the electronic device 101 may determine whether at least one frequency based on a second RAT, which is identified based on the MO, satisfies a condition associated with an SA mode, by referring to pre-stored information.

For example, Table 3 shows an example of the information pre-stored in the electronic device 101.

TABLE 3

| AFRCN | SA Support |
|---|---|
| 627264 | Yes |
| 629952 | Yes |
| 643334 | No |

The electronic device 101 may manage information as shown in Table 3, based on whether SA is used at a particular frequency, or whether NSA is used at a particular frequency. The electronic device 101 may obtain information as shown in Table 3, based on the existing operation of the electronic device 101, and/or may receive same from a network or a service provider management server. Those skilled in the art may understand that a PLMN ID, a frequency band, and/or a cell ID corresponding to an AFRCN can be further added to the information in Table 3. When additional information is further added, the electronic device 101 may compare the additional information with information identified based on the MO, to determine whether an SA mode is supported. Table 3 merely corresponds to an example, and the electronic device 101 may also manage a different format of pre-stored information. For example, the electronic device 101 may also store a frequency (e.g., an ARFCN) supporting an SA mode, and/or also store a frequency (e.g., an ARFCN) supporting an NSA mode.

According to various embodiments, if it is determined by referring to the pre-stored information that the at least one frequency based on the second RAT, which is identified based on the MO, satisfies a condition associated with an SA mode (operation 703—Yes), the electronic device 101 may perform a measurement of at least one first frequency satisfying the condition in operation 705. If it is determined by referring to the pre-stored information that the at least one frequency based on the second RAT, which is identified based on the MO, does not satisfy a condition associated with an SA mode (operation 703—No), the electronic device 101 may refrain from performing a measurement of at least one second frequency not satisfying the condition in operation 707. For example, the electronic device 101 may determine whether an ARFCN included in the MO supports an SA mode, using information as shown in Table 3. If ARFCNs of "627264" and "643334" are identified by the MO, the electronic device 101 may identify, based on Table 3, that the ARFCN of "627264" supports an SA mode, and the ARFCN of "643334" does not support an SA mode. The electronic device 101 may perform a measurement of the ARFCN of "627264", and may refrain from performing a measurement of the ARFCN of "643334".

For example, in a case where the electronic device 101 manages a list of ARFCNs supporting an SA mode, the electronic device 101 may perform a measurement of an ARFCN included in the list among the ARFCNs identified by the MO, and may refrain from performing a measurement of an ARFCN not included in the list. For example, in a case where the electronic device 101 manages a list of ARFCNs supporting an NSA mode, the electronic device 101 may perform a measurement of an ARFCN not included in the list among the ARFCNs identified by the MO, and may refrain from performing a measurement of an ARFCN included in the list.

Figure 8A:
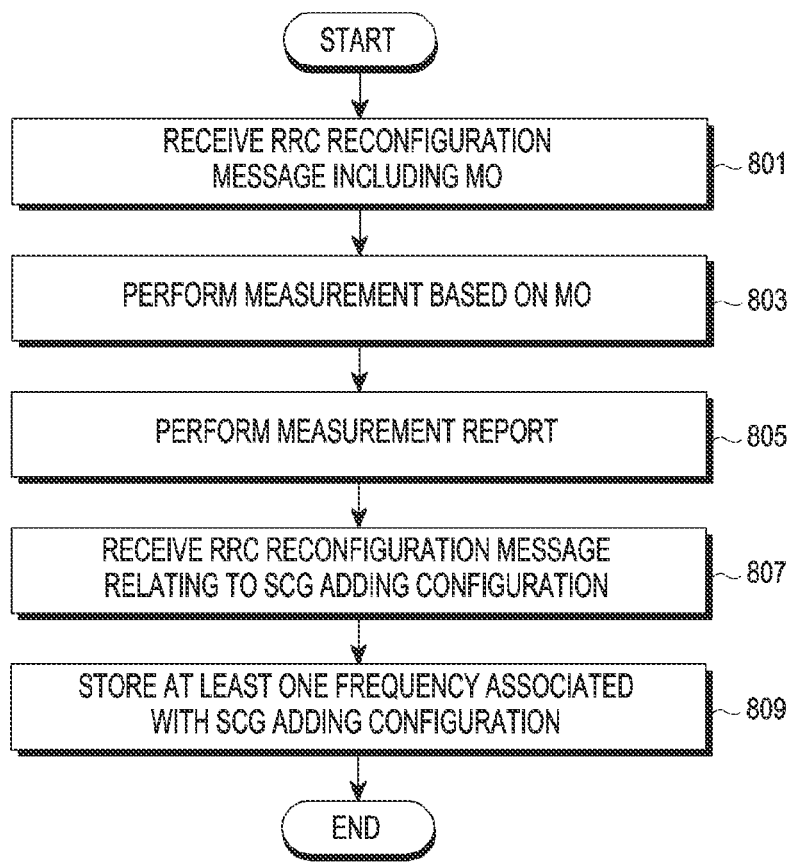
FIG. 8A to FIG. 8C are flowcharts illustrating an operation method of an electronic device according to various embodiments.
Figure 8B:
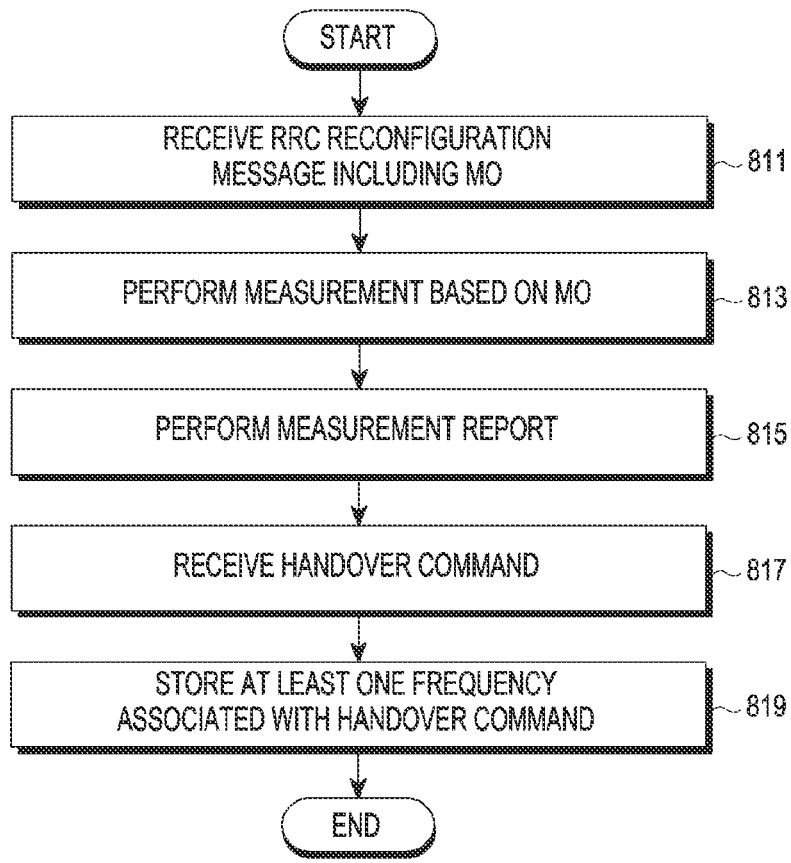
Figure 8C:
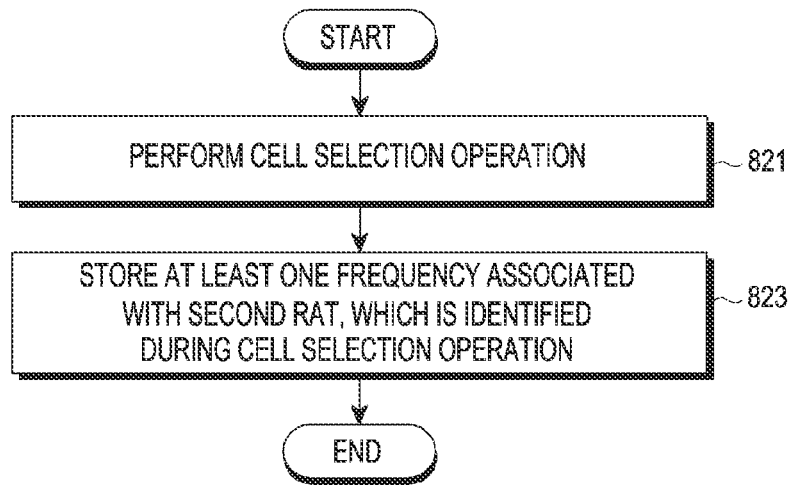

FIG. 8A to FIG. 8C are flowcharts illustrating an operation method of an electronic device according to various embodiments.

Referring to FIG. 8A, according to various embodiments, the electronic device 101 (e.g., at least one of the processor 120, the first communication processor 212, the second communication processor 214, or the integrated communication processor 260) may receive an RRC reconfiguration message including an MO in operation 801. In operation 803, the electronic device 101 may perform a measurement based on the MO. In operation 805, the electronic device 101 may perform a measurement report, based on that a result of the measurement satisfies a condition for a measurement report. For example, if it is identified that a B1 event is satisfied, the electronic device 101 may perform a measurement report, but there is no limit to a report condition. In operation 807, the electronic device 101 may receive an RRC reconfiguration message relating to an SCG adding configuration. For example, a network may receive a measurement report from the electronic device 101, and may determine to perform SCG adding of a cell corresponding to the measurement report, based on the received measurement report. In this case, the network may transmit an RRC reconfiguration message including a configuration of SCG adding to the electronic device 101. In a case where the electronic device 101 is not in a DC restriction state, the electronic device 101 may perform an RACH procedure on a cell corresponding to SCG adding, based on the received RRC reconfiguration message. Based on the RACH procedure, the electronic device 101 may also perform DC. The electronic device 101 may store at least one frequency associated with an SCG adding configuration in operation 809. For example, the electronic device 101 may add information relating to that a corresponding frequency does not support an SA mode, to information as shown in Table 3. For example, the electronic device 101 may also add a corresponding frequency in a list supporting an NSA mode.

Referring to FIG. 8B, according to various embodiments, the electronic device 101 (e.g., at least one of the processor 120, the first communication processor 212, the second communication processor 214, or the integrated communication processor 260) may receive an RRC reconfiguration message including an MO in operation 811. In operation 813, the electronic device 101 may perform a measurement based on the MO. In operation 815, the electronic device 101 may perform a measurement report, based on that a result of the measurement satisfies a condition for a measurement report. For example, if it is identified that a B1 event is satisfied, the electronic device 101 may perform a measurement report, but there is no limit to a report condition. In operation 817, the electronic device 101 may receive a handover command. For example, a network may receive a measurement report from the electronic device 101, and may determine to perform a handover to a cell corresponding to the measurement report, based on the received measurement report. In this case, the network may transmit a handover command to the electronic device 101. The electronic device 101 may perform a handover procedure, based on the received handover command. The electronic device 101 may store at least one frequency associated with the handover command in operation 819. For example, the electronic device 101 may add information relating to that a corresponding frequency supports an SA mode, to information as shown in Table 3. For example, the electronic device 101 may also add a corresponding frequency in a list supporting a NSA mode.

Referring to FIG. 8C, according to various embodiments, the electronic device 101 (e.g., at least one of the processor 120, the first communication processor 212, the second communication processor 214, or the integrated communication processor 260) may perform a cell selection operation in operation 821. For example, the electronic device 101 may perform a cell selection operation, based on a second RAT. In operation 823, the electronic device 101 may store at least one frequency associated with a second RAT, which is identified during the cell selection operation. For example, a frequency corresponding to a cell operable as a serving cell may be managed to support an SA mode by the electronic device 101. FIG. 8A to FIG. 8C merely correspond to examples, and there is no limit to a configuration for determination on whether an SA mode and an NSA mode are supported.

Figure 9:
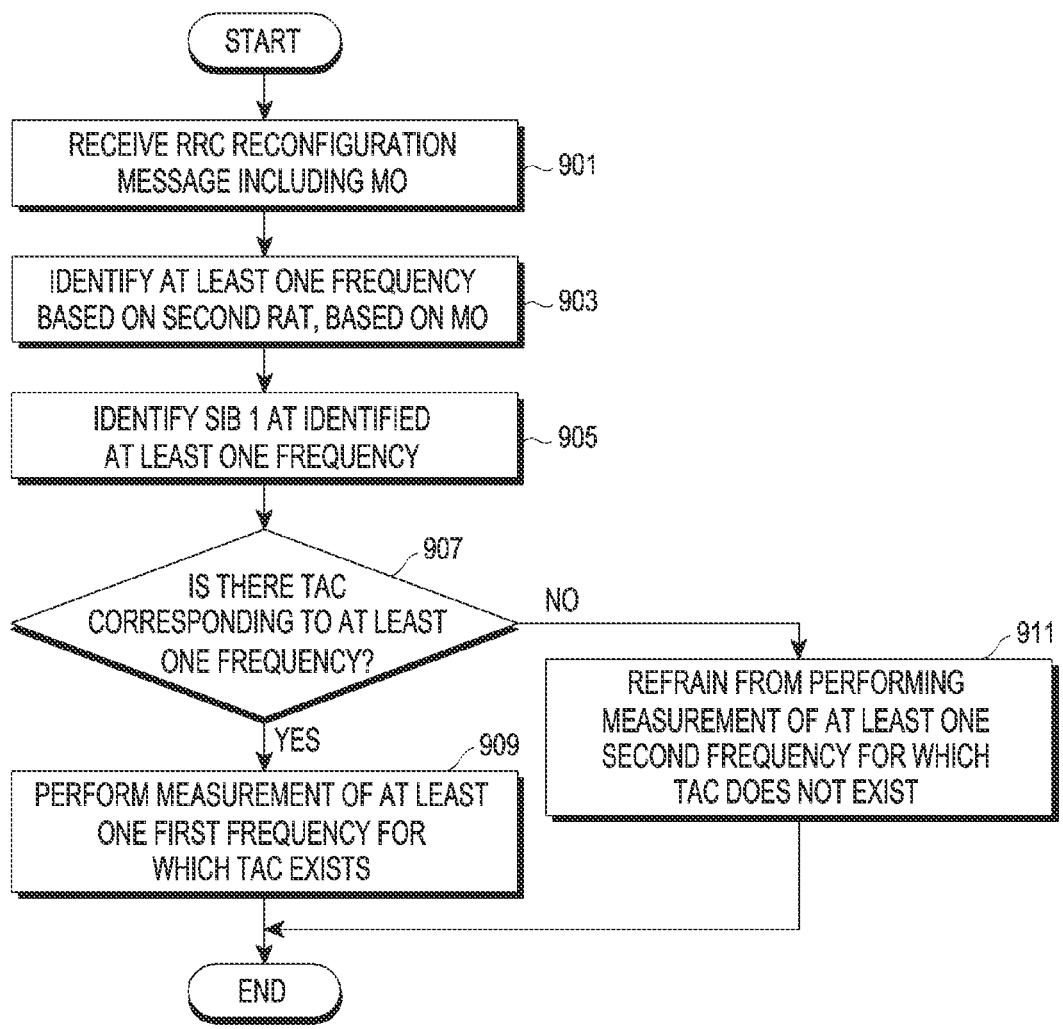
FIG. 9 is a flowchart illustrating an operation method of an electronic device according to various embodiments.

FIG. 9 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including an MO in operation 901. In operation 903, the electronic device 101 may identify at least one frequency based on a second RAT, based on the MO. In operation 905, the electronic device 101 may identify an SIB 1 based on the second RAT at the identified at least one frequency. For example, after and/or while performing a measurement at a frequency identified based on the MO, the electronic device 101 may identify (e.g., decode) an SIB 1 at the corresponding frequency, but the electronic device may also be configured to identify an SIB 1 while refrain from performing a measurement according to implementation. The SIB 1 may include or not include an IE of a tracking area code (TAC). Existence of a field of a TAC may indicate that a cell at least partially supports an SA operation. Non-existence of a TAC field may indicate that a corresponding cell supports only an EN-DC function.

According to various embodiments, the electronic device 101 may determine that there is a TAC corresponding to the at least one frequency, in operation 907. For example, the electronic device may receive an RRC reconfiguration message as shown in Table 2. As described in relation to Table 2, the RRC reconfiguration message according to the example in Table 2 may include ARFCNs of "636654" and "627264" as frequencies to be measured. The electronic device 101 may identify a first SIB 1 at a first frequency corresponding to the ARFCN of "636654", and may identify a second SIB 1 at a second frequency corresponding to the ARFCN of "627264". Table 4 shows an example of SIB 1s.

TABLE 4

| First SIB 1 | Second SIB 1 |
| --- | --- |
| systemInformationBlockType1 | systemInformationBlockType1 |
| PLMN-IdentityInfo | PLMN-IdentityInfo |
| plmn-IdentityList: 1 item | plmn-IdentityList: 1 item |
| PLMN-Identity | PLMN-Identity |
| mcc: 3 items | mcc: 3 items |
| MCC-MNC-Digit: 4 | MCC-MNC-Digit: 4 |
| MCC-MNC-Digit: 6 | MCC-MNC-Digit: 6 |
| MCC-MNC-Digit: 0 | MCC-MNC-Digit: 0 |
| mnc: 2 items | mnc: 2 items |
| MCC-MNC-Digit: 1 | MCC-MNC-Digit: 1 |
| MCC-MNC-Digit: 1 | MCC-MNC-Digit: 1 |
| trackingAreaCode: 75bd0a | trackingAreaCode: - |
| cell Identity: 7588f50800 | cell Identity: 7619f50800 |

It may be identified that the TAC of "75bd0a" exists in the first SIB 1, and there is no TAC in the second SIB 1. This may imply that a cell corresponding to the ARFCN of "636654" at least supports an SA mode, and a cell corresponding to the ARFCN of "627264" supports only EN-DC.

According to various embodiments, when there is a TAC corresponding to the at least one frequency (operation 907—Yes), the electronic device 101 may perform a measurement of at least one first frequency for which a TAC exists, in operation 909. When there is no TAC corresponding to the at least one frequency (operation 907—No), the electronic device 101 may refrain from performing a measurement of at least one second frequency for which a TAC does not exist, in operation 911. In an embodiment of the SIB 1s in Table 4, the electronic device 101 may perform a measurement at a frequency corresponding to the ARFCN of "636654", and may refrain from performing a measurement at a frequency corresponding to the ARFCN of "627264".

Figure 10:
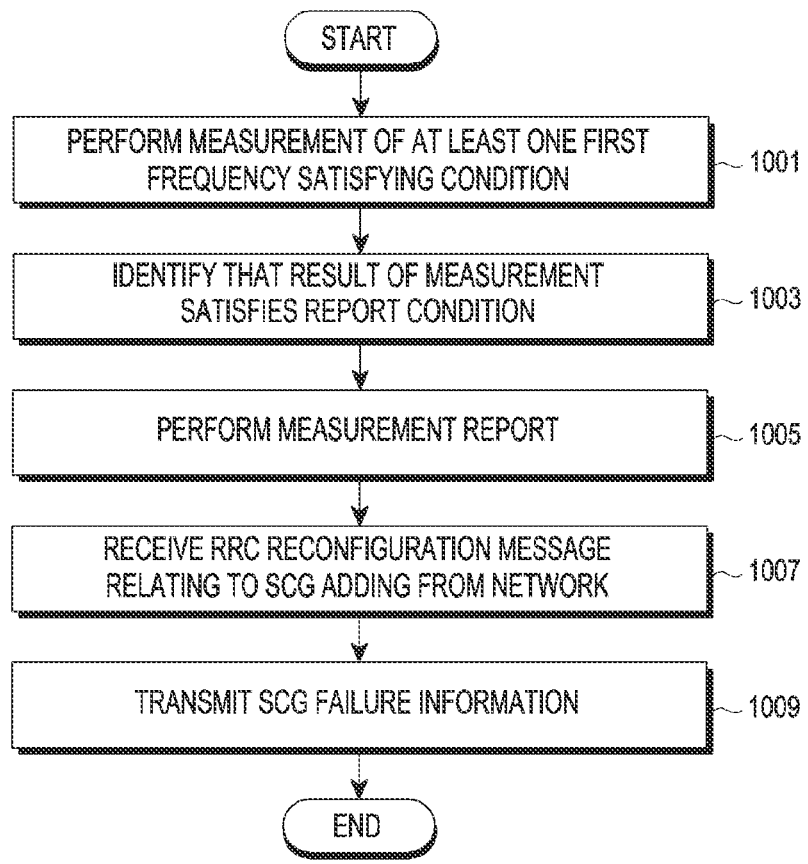
FIG. 10 is a flowchart according to an example embodiment.

FIG. 10 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may perform a measurement of at least one first frequency satisfying a condition in operation 1001. For example, the electronic device 101 may identify that the at least one first frequency satisfies a condition associated with SA, based on an SIB 24 of a first RAT, based on pre-stored information, and/or based on an SIB 1 of a second RAT. The electronic device 101 may identify that a result of the measurement satisfies a report condition (e.g., a B1 event), in operation 1003. Based on the satisfaction of the report condition, the electronic device 101 may perform a measurement report in operation 1005.

According to various embodiments, the electronic device 101 may receive an RRC reconfiguration message relating to SCG adding from a network in operation 1007. For example, even in a case where a condition associated with SA is satisfied, the network may also transmit an RRC reconfiguration message to the electronic device 101 to perform SCG adding rather than a handover. In this case, the electronic device 101 may refrain from performing SCG adding, based on that the electronic device is in a DC restriction state. The electronic device 101 may transmit an SCG failure information message to the network in operation 1009. For example, the electronic device 101 may transmit an SCG failure information message including a configuration of "synchReconfigFailureSCG" as an SCG failure cause, and there is no limit to the SCG failure cause. Although not illustrated, the electronic device 101 may manage a frequency corresponding to the SCG failure information message for a point that SA is disabled at the frequency, and may also be configured not to perform a measurement of the corresponding frequency later.

Figure 11:
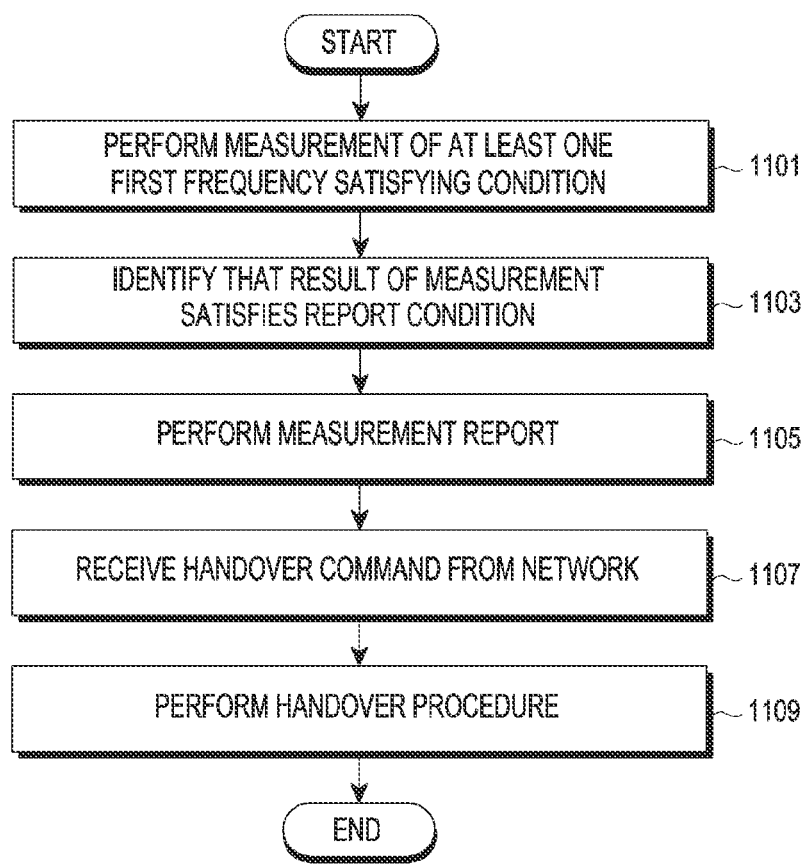
FIG. 11 is a flowchart illustrating an operation method of an electronic device according to various embodiments.

FIG. 11 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may perform a measurement of at least one first frequency satisfying a condition in operation 1101. For example, the electronic device 101 may identify that the at least one first frequency satisfies a condition associated with SA, based on an SIB 24 of a first RAT, based on pre-stored information, and/or based on an SIB 1 of a second RAT. The electronic device 101 may identify that a result of the measurement satisfies a report condition (e.g., a B1 event), in operation 1103. Based on the satisfaction of the report condition, the electronic device 101 may perform a measurement report in operation 1105.

According to various embodiments, the electronic device 101 may receive a handover command from a network in operation 1107. In operation 1109, the electronic device 101 may perform a handover procedure, based on the reception of the handover command. For example, the electronic device 101 may confirm a handover to an (R)AN (e.g., NG-RAN) corresponding to the second RAT, based on the reception of the handover command. The electronic device 101 may move from an (R)AN (e.g., E-UTRAN) corresponding to the first RAT (e.g., E-UTRA), and synchronize with a target (R)AN (e.g., NG-RAN). The (R)AN (e.g., NG-RAN) corresponding to the second RAT may notify a core network (e.g., an AMF) corresponding to the second RAT that the electronic device 101 has been handed over to the (R)AN (e.g., NG-RAN). The core network corresponding to the second RAT may notify the handover by transmitting a forward relocation complete notification message to a core network (e.g., an MME) corresponding to the first RAT. The electronic device 101 may also perform a procedure of registration from a system (e.g., an EPS) corresponding to the first RAT to a system (e.g., a 5GS) corresponding to the second RAT. The handover procedure may follow, for example, 3GPP TS 23.502 or 3GPP TS 24.502, but is not limited. The electronic device 101 may perform communication based on the second RAT after registered in the system of the second RAT by an SA mode. Accordingly, in a DC restriction state, the electronic device 101 can perform an inter-RAT handover while preventing and/or alleviating DC.

Figure 12:
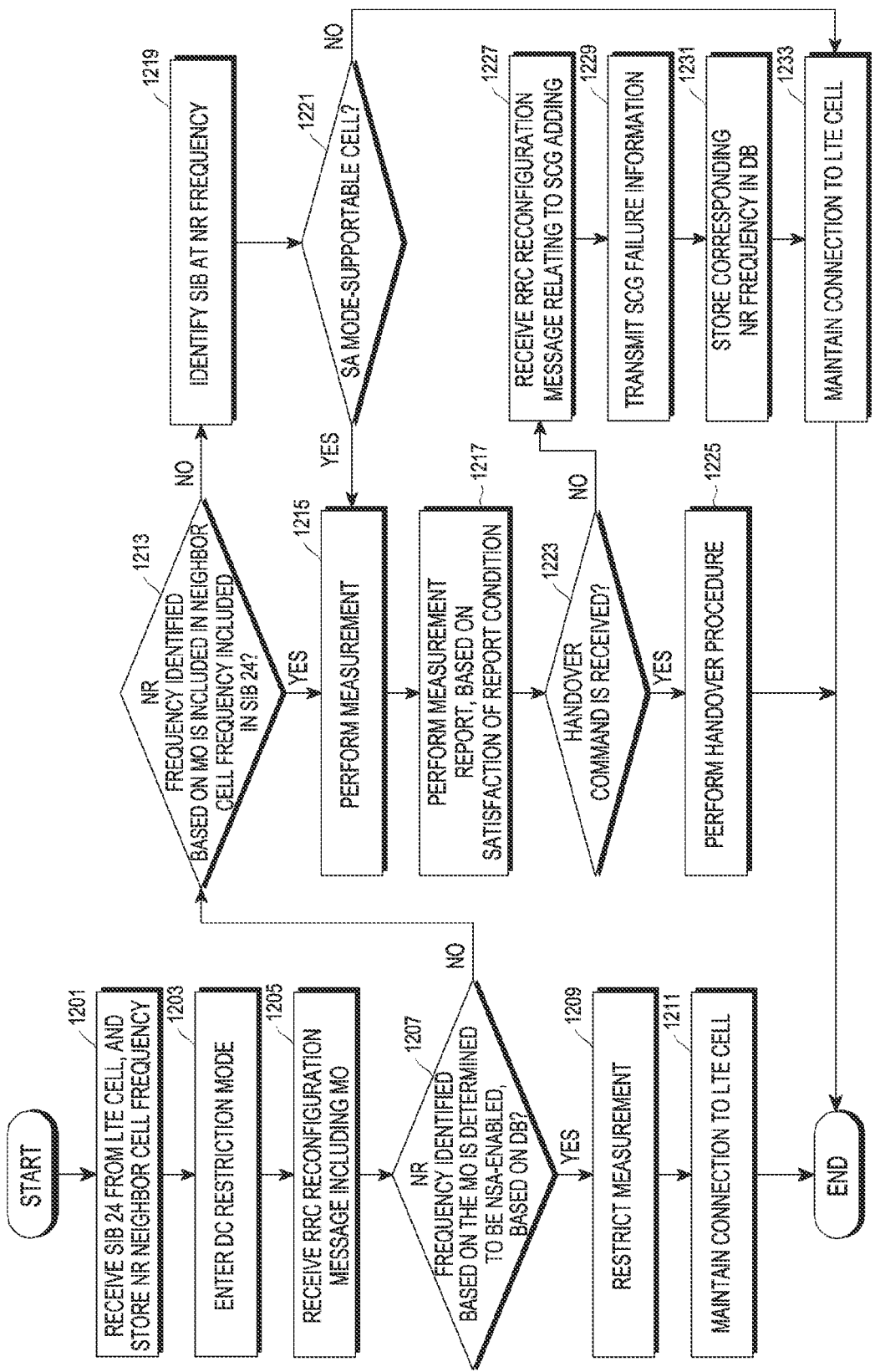
FIG. 12 is a flowchart illustrating an operation method of an electronic device according to various embodiments.

FIG. 12 is a flowchart illustrating an operation method of an electronic device according to various embodiments. In an embodiment of FIG. 12, a case where a first RAT is E-UTRA, and a second RAT is NR is considered. However, those skilled in the art may understand that the embodiment is applicable to even a case where the first RAT is NR, and the second RAT is E-UTRA.

According to various embodiments, the electronic device 101 (e.g., at least one of the processor 120, the first communication processor 212, the second communication processor 214, or the integrated communication processor 260) may receive an SIB 24 from an LTE cell, and store an NR neighbor cell frequency in operation 1201. For example, the SIB 24 may include an NR neighbor cell frequency supporting an SA mode. In operation 1203, the electronic device 101 may enter a DC restriction mode. In operation 1205, the electronic device 101 may receive an RRC reconfiguration message including an MO. In operation 1207, the electronic device 101 may determine whether an NR frequency identified based on the MO is determined to be NSA-enabled, based on a database (DB). Those skilled in the art may understand that whether SA is disabled can be determined alternatively and/or additionally to whether NSA is enabled. For example, whether SA is enabled, and/or whether NSA is enabled may be stored in the database for each frequency. If it is determined that the NR frequency identified based on the MO is NSA-enabled (operation 1207—Yes), the electronic device 101 may restrict measurement in operation 1209. Accordingly, the electronic device 101 may maintain a connection to the LTE cell (or a registration in an EPS (or an EPC) in operation 1211.

If it is determined that the NR frequency identified based on the MO is NSA-disabled (operation 1207—No), the electronic device 101 may determine whether the NR frequency identified based on the MO is included in the neighbor cell frequency included in the SIB 24, in operation 1213. The NR frequency identified based on the MO, which is included in the neighbor cell frequency included in the SIB 24, may imply that the NR frequency identified based on the MO supports an SA mode. In a case where the NR frequency identified based on the MO is included in the neighbor cell frequency included in the SIB 24 (operation 1213—Yes), the electronic device 101 may perform a measurement at the corresponding frequency in operation 1215. In operation 1217, the electronic device 101 may perform a measurement report, based on that a result of the measurement satisfies a report condition (e.g., a B1 event). In a case where the NR frequency identified based on the MO is not included in the neighbor cell frequency included in the SIB 24 (operation 1213—No), the electronic device 101 may identify an SIB (e.g., an SIB 1) at the NR frequency in operation 1219. The electronic device 101 may determine whether a cell corresponding to the NR frequency is a SA mode-supportable cell, based on the identified SIB (e.g., an SIB 1) in operation 1221. For example, the electronic device 101 may determine whether a cell corresponding to the NR frequency is a SA mode-supportable cell, based on whether a TAC exists in the identified SIB 1. If it is determined that a cell corresponding to the NR frequency is a SA mode-supportable cell (operation 1221—Yes), the electronic device 101 may perform a measurement at the NR frequency in operation 1215. If it is not determined that a cell corresponding to the NR frequency is a SA mode-supportable cell (operation 1221—No), the electronic device 101 may maintain the connection to the LTE cell in operation 1233.

According to various embodiments, the electronic device 101 may perform a measurement report in operation 1217, and then identify whether a handover command is received from a network, in operation 1223. As described above, in a case where an MR is performed based on satisfaction of a condition of a B1 event, the network may provide a handover command to the electronic device 101, but the network may also provide an RRC reconfiguration message relating to SCG adding to the electronic device 101 in some cases. If a handover command is received (operation 1223—Yes), the electronic device 101 may perform a handover procedure in operation 1225. If a handover command is not received (operation 1223—No), the electronic device 101 may also receive an RRC reconfiguration message relating to SCG adding in operation 1227. In operation 1229, based on that the electronic device 101 is in a DC restriction state, the electronic device may refrain from performing SCG adding, and transmit SCG failure information to the network. There is no limit to the SCG failure cause of the SCG failure information. The electronic device 101 may store the corresponding NR frequency in the DB in operation 1231. For example, the electronic device 101 may store the corresponding NR frequency as an NSA-enabled frequency, and/or an SA-disabled frequency. In operation 1233, the electronic device 101 may maintain the connection to the LTE cell.

Figure 13:
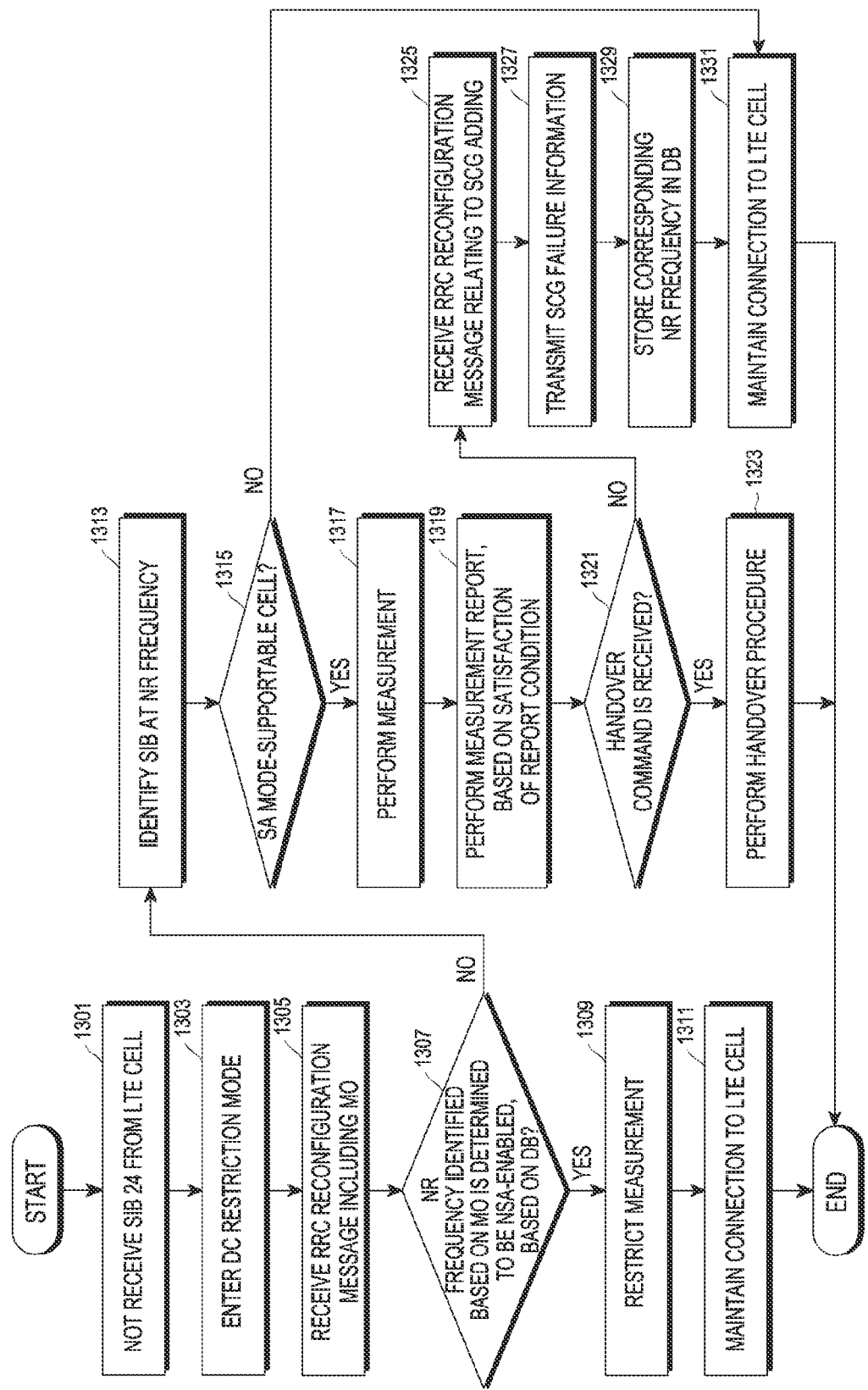
FIG. 13 is a flowchart illustrating an operation method of an electronic device according to various embodiments.

FIG. 13 is a flowchart illustrating an operation method of an electronic device according to various embodiments. In an embodiment of FIG. 13, a case where a first RAT is E-UTRA, and a second RAT is NR is considered. However, those skilled in the art may understand that the embodiment is applicable to even a case where the first RAT is NR, and the second RAT is E-UTRA. In the embodiment of FIG. 12, the electronic device 101 receives an SIB 24 based on the first RAT, but the electronic device 101 may not receive an SIB 24 in the embodiment of FIG. 13.

According to various embodiments, the electronic device 101 (e.g., at least one of the processor 120, the first communication processor 212, the second communication processor 214, or the integrated communication processor 260) may not receive an SIB 24 from an LTE cell in operation 1301. Operation 1301 is simply given to describe that the electronic device 101 does not receive an SIB 24, and the electronic device 101 may be configured not to perform a separate operation so as not to receive an SIB 24. In operation 1303, the electronic device 101 may enter a DC restriction mode. In operation 1305, the electronic device 101 may receive an RRC reconfiguration message including an MO. In operation 1307, the electronic device 101 may determine whether an NR frequency identified based on the MO is determined to be NSA-enabled, based on a database (DB). For example, whether SA is enabled, and/or whether NSA is enabled may be stored in the database for each frequency. If it is determined that the NR frequency identified based on the MO is NSA-enabled (operation 1307—Yes), the electronic device 101 may restrict measurement in operation 1309. Accordingly, the electronic device 101 may maintain a connection to the LTE cell (or a registration in an EPS (or an EPC) in operation 1311.

If it is determined that the NR frequency identified based on the MO is NSA-disabled (operation 1307—No), the electronic device 101 may identify an SIB (e.g., an SIB 1) at the NR frequency in operation 1313. The electronic device 101 may determine whether a cell corresponding to the NR frequency is a SA mode-supportable cell, based on the identified SIB (e.g., an SIB 1) in operation 1315. For example, the electronic device 101 may determine whether a cell corresponding to the NR frequency is a SA mode-supportable cell, based on whether a TAC exists in the identified SIB 1. If it is determined that a cell corresponding to the NR frequency is a SA mode-supportable cell (operation 1315—Yes), the electronic device 101 may perform a measurement at the NR frequency in operation 1317. If it is determined that a cell corresponding to the NR frequency is not a SA mode-supportable cell (operation 1315—No), the electronic device 101 may maintain the connection to the LTE cell in operation 1331.

According to various embodiments, based on that a report condition (e.g., a B1 event) is satisfied, the electronic device 101 may perform a measurement report in operation 1319, and then identify whether a handover command is received from a network, in operation 1321. As described above, in a case where an MR is performed based on satisfaction of a condition of a B1 event, the network may provide a handover command to the electronic device 101, but the network may also provide an RRC reconfiguration message relating to SCG adding to the electronic device 101 in some cases. If a handover command is received (operation 1321—Yes), the electronic device 101 may perform a handover procedure in operation 1323. If a handover command is not received (operation 1321—No), the electronic device 101 may also receive an RRC reconfiguration message relating to SCG adding in operation 1325. In operation 1327, based on that the electronic device 101 is in a DC restriction state, the electronic device may refrain from performing SCG adding, and transmit SCG failure information to the network. There is no limit to the SCG failure cause of the SCG failure information. The electronic device 101 may store the corresponding NR frequency in the DB in operation 1329. For example, the electronic device 101 may store the corresponding NR frequency as an NSA-enabled frequency, and/or an SA-disabled frequency. In operation 1331, the electronic device 101 may maintain the connection to the LTE cell.

Figure 14:
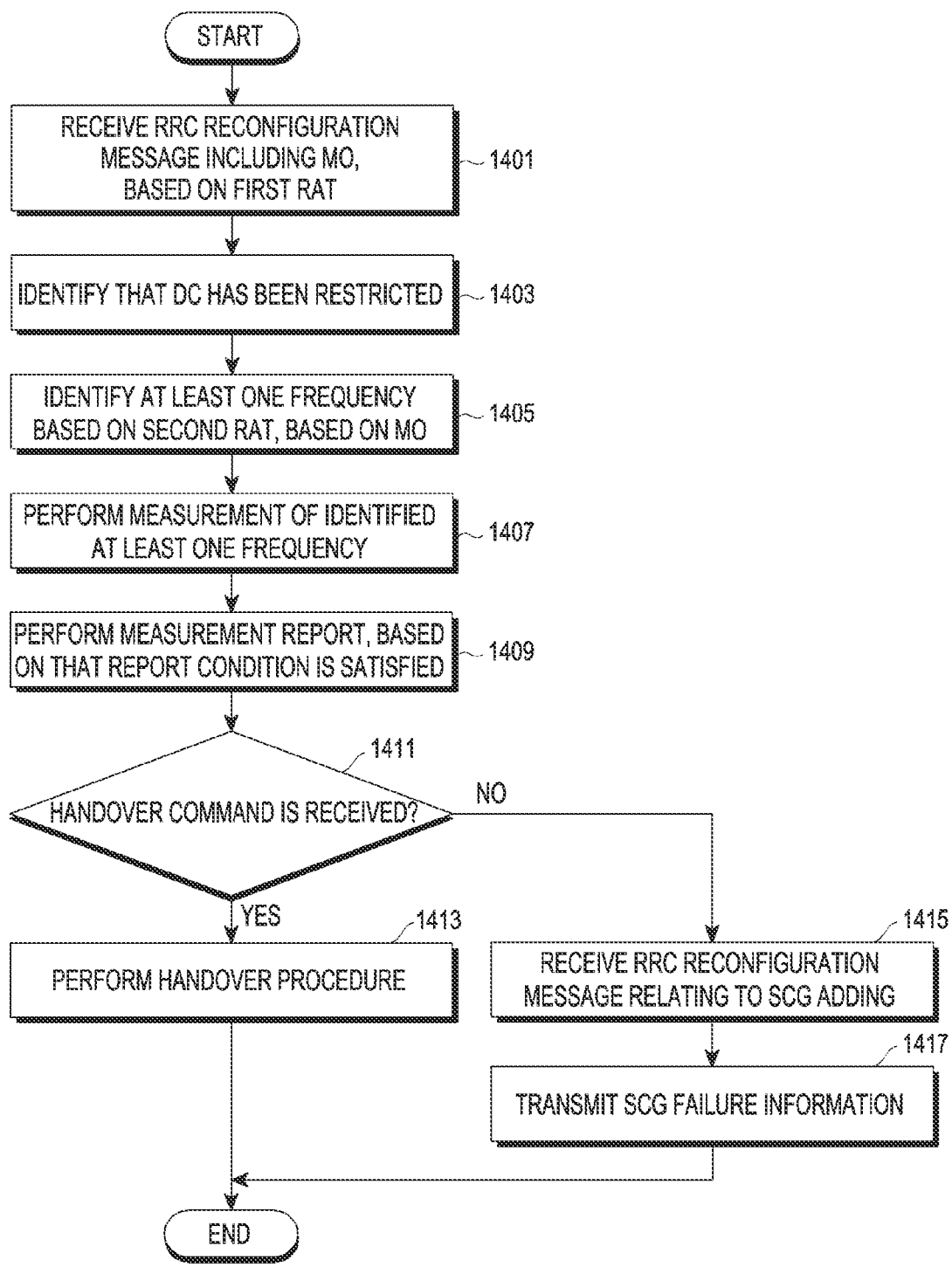
FIG. 14 is a flowchart illustrating an operation method of an electronic device according to various embodiments.

FIG. 14 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including an MO, based on a first RAT, in operation 1401. In operation 1403, the electronic device 101 may identify that DC is restricted. In operation 1405, the electronic device 101 may identify at least one frequency based on a second RAT, based on the MO. In operation 1407, the electronic device 101 may perform a measurement of the identified at least one frequency. For example, in the embodiment of FIG. 4, the electronic device 101 performs a measurement of a frequency satisfying a condition associated with an SA mode, and refrain from performing a measurement of a frequency not satisfying a condition associated with an SA mode. The electronic device 101 according to an embodiment of FIG. 14 may be configured to perform a measurement of all frequencies identified based on the MO. In operation 1409, the electronic device 101 may perform a measurement report, based on that a report condition is satisfied.

According to various embodiments, the electronic device 101 may identify whether a handover command is received in response to the measurement report in operation 1411. If a handover command is received (operation 1411—Yes), the electronic device 101 may perform a handover procedure in operation 1413. If a handover command is not received (operation 1413—No), the electronic device 101 may receive, for example, an RRC reconfiguration message relating to SCG adding in operation 1415. Based on that the electronic device 101 is in a DC restriction state, the electronic device may refrain from performing SCG adding, and transmit an SCG failure information message to a network in operation 1417. Accordingly, in a DC restriction state, the electronic device 101 can perform an inter-RAT handover while refrain from performing SCG adding.

According to various embodiments, an electronic device may include at least one processor configured to support a first radio access technology (RAT) and a second RAT, wherein the at least one processor is configured to: receive a radio resource control (RRC) reconfiguration message including a measurement object (MO) from a network, based on the first RAT, and based on dual connectivity (DC) of the first RAT and the second RAT being identified to be restricted, perform a measurement of at least one first frequency satisfying a condition associated with a stand alone (SA) mode among at least one frequency based on the second RAT, which is identified based on the MO, and refrain from performing a measurement of at least one second frequency not satisfying the condition among the at least one frequency.

According to various embodiments, the at least one processor may be further configured to, based on a result of a measurement of at least partial frequency among the at least one first frequency satisfying a report condition, report the measurement result to the network, based on the first RAT.

According to various embodiments, the at least one processor may be further configured to, based on a command of a handover to a cell corresponding to the second RAT being received from the network in response to the reporting, perform a procedure of a handover from a cell corresponding to the first RAT to a cell corresponding to the second RAT.

According to various embodiments, the at least one processor may be further configured to, based on another RRC reconfiguration message relating to second cell group (SCG) adding of a cell corresponding to the second RAT being received from the network in response to the reporting, transmit an SCG failure information message to the network, based on the first RAT.

According to various embodiments, the at least one processor may be further configured to: receive a system information block (SIB) 24 from the network, based on the first RAT, and the at least one processor may be further configured to, based on the at least one first frequency being included in the SIB 24, identify that the at least one first frequency satisfies the condition associated with the SA mode, and/or based on the at least one second frequency not being included in the SIB 24, identify that the at least one second frequency does not satisfy the condition associated with the SA mode.

According to various embodiments, the electronic device may further include: a memory configured to store at least one of first information indicating whether the SA mode is supported with respect to each of multiple frequencies, second information indicating whether an NSA mode is supported with respect to each of the multiple frequencies, third information relating to a frequency supporting the SA mode, or fourth information relating to a frequency supporting the NSA mode, and the at least one processor may be further configured to, based on at least one of the first information, the second information, the third information, or the fourth information, identify that the first frequency satisfies the condition associated with the SA mode, and/or that the second frequency does not satisfy the condition associated with the SA mode.

According to various embodiments, the at least one processor may be further configured to: identify, on at least one frequency based on the second RAT, which is identified based on the MO, at least one SIB 1 corresponding to each of the at least one frequency, based on the second RAT, and the at least one processor may be further configured to: identify that the at least one first frequency including a tracking area code (TAC) among the at least one SIB 1 satisfies the condition associated with the SA mode, and/or that the at least one second frequency not including a TAC among the at least one SIB 1 does not satisfy the condition associated with the SA mode.

According to various embodiments, the at least one processor may be further configured to, based on a remaining power of a battery of the electronic device being equal to or less than threshold remaining power, and/or based on a temperature of the electronic device being equal to or greater than a threshold temperature, identify that the DC is restricted.

According to various embodiments, the at least one processor may be further configured to, based on a current data rate and/or a predicted data rate of the electronic device being equal to or less than a threshold data rate, identify that the DC is restricted.

According to various embodiments, the electronic device may support multiple subscriber identification modules (SIMs) as a dual SIM dual standby (DSDS) mode, and the at least one processor may be further configured to, based on a first SIM associated with transmission or reception of a voice packet among the multiple SIMs supported by the electronic device being used, identify that the DC is restricted.

According to various embodiments, an operation method of an electronic device configured to support a first radio access technology (RAT) and a second RAT may include receiving a radio resource control (RRC) reconfiguration message including a measurement object (MO) from a network, based on the first RAT, and based on dual connectivity (DC) of the first RAT and the second RAT being identified to be restricted, performing a measurement of at least one first frequency satisfying a condition associated with a stand alone (SA) mode among at least one frequency based on the second RAT, which is identified based on the MO, and refrain from performing a measurement of at least one second frequency not satisfying the condition among the at least one frequency.

According to various embodiments, the operation method of the electronic device may further include, based on a result of a measurement of at least partial frequency among the at least one first frequency satisfying a report condition, reporting the measurement result to the network, based on the first RAT.

According to various embodiments, the operation method of the electronic device may further include, based on a command of a handover to a cell corresponding to the second RAT being received from the network in response to the reporting, performing a procedure of a handover from a cell corresponding to the first RAT to a cell corresponding to the second RAT.

According to various embodiments, the operation method of the electronic device may further include, based on another RRC reconfiguration message relating to second cell group (SCG) adding of a cell corresponding to the second RAT being received from the network in response to the reporting, transmitting an SCG failure information message to the network, based on the first RAT.

According to various embodiments, the operation method of the electronic device may further include: receiving a system information block (SIB) 24 from the network, based on the first RAT, and wherein the operation method of the electronic device may further include, based on that the at least one first frequency is included in the SIB 24, identifying that the at least one first frequency satisfies the condition associated with the SA mode, and/or based on the at least one second frequency not being included in the SIB 24, identifying that the at least one second frequency does not satisfy the condition associated with the SA mode.

According to various embodiments, the operation method of the electronic device may further include, based on at least one of first information indicating whether the SA mode is supported with respect to each of multiple frequencies, second information indicating whether an NSA mode is supported with respect to each of the multiple frequencies, third information relating to a frequency supporting the SA mode, or fourth information relating to a frequency supporting the NSA mode, identifying that the first frequency satisfies the condition associated with the SA mode, and/or that the second frequency does not satisfy the condition associated with the SA mode.

According to various embodiments, the operation method of the electronic device may further include identifying, on at least one frequency based on the second RAT, which is identified based on the MO, at least one SIB 1 corresponding to each of the at least one frequency, based on the second RAT, and the operation method of the electronic device may further include identifying that the at least one first frequency including a tracking area code (TAC) among the at least one SIB 1 satisfies the condition associated with the SA mode, and/or that the at least one second frequency not including a TAC among the at least one SIB 1 does not satisfy the condition associated with the SA mode.

According to various embodiments, the operation method of the electronic device may further include, based on a remaining power of a battery of the electronic device being equal to or less than threshold remaining power, and/or based on a temperature of the electronic device being equal to or greater than a threshold temperature, identifying that the DC is restricted.

According to various embodiments, the operation method of the electronic device may further include, based on a current data rate and/or a predicted data rate of the electronic device being equal to or less than a threshold data rate, identifying that the DC is restricted.

According to various embodiments, an electronic device may include at least one processor configured to support a first radio access technology (RAT) and a second RAT, wherein the at least one processor is configured to: receive a radio resource control (RRC) reconfiguration message including a measurement object (MO) from a network, based on the first RAT, and based on dual connectivity (DC) of the first RAT and the second RAT being identified to be restricted, perform a measurement of at least one frequency based on the second RAT, which is identified based on the MO, report, based on a result of a measurement of at least partial frequency among the at least one frequency satisfying a report condition, the measurement result to the network, based on the first RAT, perform, based on a command of a handover to a cell corresponding to the second RAT being received from the network in response to the reporting, a procedure of a handover from a cell corresponding to the first RAT to a cell corresponding to the second RAT, and based on another RRC reconfiguration message relating to second cell group (SCG) adding of a cell corresponding to the second RAT being received from the network in response to the reporting, transmit an SCG failure information message to the network, based on the first RAT.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   at least one processor configured to support a first radio access technology (RAT) and a second RAT, and memory, wherein the memory stores instructions that, when executed by the at least one processor, cause the electronic device to:
receive a radio resource control (RRC) reconfiguration message including a measurement object (MO) from a network, wherein the MO includes information on a frequency for which the electronic device is required to perform a measurement,
identify that dual connectivity (DC) of the first RAT and the second RAT is restricted,
identify, based on information on the frequency for which the electronic device is required to perform the measurement included in the MO, a first cell supporting a stand alone (SA) mode and a second cell not supporting the SA mode while the DC is restricted, and
perform a measurement of at least one first frequency of the first cell and refrain from a measurement of at least one second frequency of the second cell.

2. The electronic device of claim 1, wherein the instructions cause the electronic device to, based on a result of a measurement of at least partial frequency among the at least one first frequency satisfying a report condition, report the measurement result to the network, based on the first RAT.

3. The electronic device of claim 2, wherein the instructions cause the electronic device to, based on a command of a handover to a cell corresponding to the second RAT being received from the network in response to the reporting, perform a procedure of a handover from a cell corresponding to the first RAT to a cell corresponding to the second RAT.

4. The electronic device of claim 2, wherein the instructions cause the electronic device to, based on another RRC reconfiguration message relating to second cell group (SCG) addition of a cell corresponding to the second RAT being received from the network in response to the reporting, transmit an SCG failure information message to the network, based on the first RAT.

5. The electronic device of claim 1, wherein the instructions cause the electronic device to receive a system information block (SIB) 24 from the network, based on the first RAT, and
wherein the at least one processor is further configured to, based on the at least one first frequency being included in the SIB 24, identify that the at least one first frequency satisfies the condition associated with the SA mode, and/or
based on that the at least one second frequency not being included in the SIB 24, identify that the at least one second frequency does not satisfy the condition associated with the SA mode.

6. The electronic device of claim 1, wherein the memory stores at least one of first information indicating whether the SA mode is supported with respect to each of multiple frequencies, second information indicating whether an NSA mode is supported with respect to each of the multiple frequencies, third information relating to a frequency supporting the SA mode, or fourth information relating to a frequency supporting the NSA mode,
wherein the instructions cause the electronic device to, based on at least one of the first information, the second information, the third information, or the fourth information, identify that the first frequency satisfies the condition associated with the SA mode, and/or that the second frequency does not satisfy the condition associated with the SA mode.

7. The electronic device of claim 1, wherein the instructions cause the electronic device to identify, on at least one frequency based on the second RAT, which is identified based on the MO, at least one SIB 1 corresponding to each of the at least one frequency, based on the second RAT, and
wherein instructions cause the electronic device to identify that the at least one first frequency including a tracking area code (TAC) among the at least one SIB 1 satisfies the condition associated with the SA mode, and/or that the at least one second frequency not including a TAC among the at least one SIB 1 does not satisfy the condition associated with the SA mode.

8. The electronic device of claim 1, wherein the instructions cause the electronic device to, based on a remaining power of a battery of the electronic device being equal to or less than threshold remaining power, and/or based on a temperature of the electronic device being equal to or greater than a threshold temperature, identify that the DC is restricted.

9. The electronic device of claim 1, wherein the instructions cause the electronic device to, based on a current data rate and/or a predicted data rate of the electronic device being equal to or less than a threshold data rate, identify that the DC is restricted.

10. The electronic device of claim 1, wherein the electronic device is configured to support multiple subscriber identification modules (SIMs) as a dual SIM dual standby (DSDS) mode, and
wherein the instructions cause the electronic device to, based on a first SIM associated with transmission or reception of a voice packet among the multiple SIMs supported by the electronic device being used, identify that the DC is restricted.

11. A method, comprising:
receiving a radio resource control (RRC) reconfiguration message including a measurement object (MO) from a network, wherein the MO includes information on a frequency for which the electronic device is required to perform a measurement,
identifying that dual connectivity (DC) of the first RAT and the second RAT is restricted,
identifying, based on information on the frequency for which the electronic device is required to perform the measurement included in the MO, a first cell supporting a stand alone (SA) mode and a second cell not supporting the SA mode while the DC is restricted, and
performing a measurement of at least one first frequency of the first cell and refraining from a measurement of at least one second frequency of the second cell.

12. The method of claim 11, further comprising, based on a result of a measurement of at least partial frequency among the at least one first frequency satisfying a report condition, reporting the measurement result to the network, based on the first RAT.

13. The method of claim 12, further comprising, based on a command of a handover to a cell corresponding to the second RAT being received from the network in response to the reporting, performing a procedure of a handover from a cell corresponding to the first RAT to a cell corresponding to the second RAT.

14. The method of claim 12, further comprising, based on another RRC reconfiguration message relating to second cell group (SCG) adding of a cell corresponding to the second RAT being received from the network in response to the reporting, transmitting an SCG failure information message to the network, based on the first RAT.

15. The method of claim 11, further comprising receiving a system information block (SIB) 24 from the network, based on the first RAT, and wherein the operation method further comprises, based on the at least one first frequency being included in the SIB 24, identifying that the at least one first frequency satisfies the condition associated with the SA mode, and/or based on that the at least one second frequency not being included in the SIB 24, identifying that the at least one second frequency does not satisfy the condition associated with the SA mode.

16. The method of claim 11, further comprising, based on at least one of first information indicating whether the SA mode is supported with respect to each of multiple frequencies, second information indicating whether an NSA mode is supported with respect to each of the multiple frequencies, third information relating to a frequency supporting the SA mode, or fourth information relating to a frequency supporting the NSA mode, identifying that the first frequency satisfies the condition associated with the SA mode, and/or that the second frequency does not satisfy the condition associated with the SA mode.

17. The method of claim 11, further comprising identifying, on at least one frequency based on the second RAT, which is identified based on the MO, at least one SIB 1 corresponding to each of the at least one frequency, based on the second RAT, and wherein the method further comprises identifying that the at least one first frequency including a tracking area code (TAC) among the at least one SIB 1 satisfies the condition associated with the SA mode, and/or that the at least one second frequency not including a TAC among the at least one SIB 1 does not satisfy the condition associated with the SA mode.

18. The method of claim 11, further comprising, based on a remaining power of a battery of the electronic device being equal to or less than threshold remaining power, and/or based on a temperature of the electronic device being equal to or greater than a threshold temperature, identifying that the DC is restricted.

19. The method of claim 11, further comprising, based on a current data rate and/or a predicted data rate of the electronic device being equal to or less than a threshold data rate, identifying that the DC is restricted.

20. A computer-readable non-volatile recording medium storing instructions configured to perform one or more operations by a processor, the one or more operations comprising:

receiving a radio resource control (RRC) reconfiguration message including a measurement object (MO) from a network, wherein the MO includes information on a frequency for which the electronic device is required to perform a measurement, identifying that dual connectivity (DC) of the first RAT and the second RAT is restricted, identifying, based on information on the frequency for which the electronic device is required to perform the measurement included in the MO, a first cell supporting a stand alone (SA) mode and a second cell not supporting the SA mode while the DC is restricted, and performing a measurement of at least one first frequency of the first cell and refraining from a measurement of at least one second frequency of the second cell.

* * * * *